US009025640B2

(12) United States Patent
Haker et al.

(10) Patent No.: US 9,025,640 B2
(45) Date of Patent: May 5, 2015

(54) GLOBAL NAVIGATION SATELLITE SYSTEM SIGNAL DECOMPOSITION AND PARAMETERIZATION ALGORITHM

(71) Applicant: The United States of America, as represented by the Secretary of the Air Force, Washington, DC (US)

(72) Inventors: Marshall E Haker, Englewood, OH (US); John F Raquet, Beavercreek, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 13/915,649

(22) Filed: Jun. 12, 2013

(65) Prior Publication Data

US 2013/0336369 A1    Dec. 19, 2013

Related U.S. Application Data

(60) Provisional application No. 61/660,852, filed on Jun. 18, 2012.

(51) Int. Cl.
*H04B 1/00*      (2006.01)
*H04B 1/707*     (2011.01)
*H04B 1/7075*    (2011.01)
*G01S 19/22*     (2010.01)
*G01S 19/24*     (2010.01)

(52) U.S. Cl.
CPC .............. *H04B 1/707* (2013.01); *H04B 1/7075* (2013.01); *G01S 19/22* (2013.01); *G01S 19/24* (2013.01)

(58) Field of Classification Search
CPC ...... H04B 1/707; H04B 1/7075; G01S 19/24; G01S 19/22; G01S 19/42
USPC ........... 375/147, 142, 144, 148; 370/328, 509
See application file for complete search history.

(56) References Cited

U.S. PATENT DOCUMENTS 5,608,410 A * 3/1997 Stilp et al. ..................... 342/387
6,201,497 B1   3/2001 Snyder et al.
(Continued)

OTHER PUBLICATIONS

Verhagen, S., "The GNSS integer ambiguities: estimation and validation," Doctoral Thesis, TU Delft, Delft University of Technology, Jan. 31, 2005.
(Continued)

*Primary Examiner* — Shuwang Liu
*Assistant Examiner* — Helene Tayong
(74) *Attorney, Agent, or Firm* — AFMCLO/JAZ; Charles Figer

(57) ABSTRACT

A method and apparatus is provided for intra-PIT signal decomposition of a signal received with RF front end hardware. The method begins by aligning a signal received by RF front end hardware into integer multiples of a duration of a pseudorandom noise code sequence. A search grid is computed based on an integer multiple of the aligned signal. A plurality of initial ray parameters associated with the computed search grid is coarsely estimated. Using the coarsely estimated plurality of initial ray parameters, a fine estimation of the plurality of initial ray parameters is initiated utilizing stochastic search and optimization techniques. A stopping criteria statistic is computed by comparing a peak power of the search grid with a noise power present in the search grid. Finally, in response to determining the stopping criteria statistic being less than a stopping criteria threshold, processing a next integer multiple of the aligned signal.

21 Claims, 19 Drawing Sheets

(56) References Cited

U.S. PATENT DOCUMENTS

| | | | |
|---|---|---|---|
| 7,684,470 B2* | 3/2010 | Hughes et al. | 375/147 |
| 7,804,802 B2* | 9/2010 | Stopler | 370/335 |
| 8,089,402 B2 | 1/2012 | Maenpa et al. | |
| 8,457,177 B2* | 6/2013 | Sullivan | 375/147 |
| 8,477,828 B2* | 7/2013 | Schmid | 375/147 |
| 2002/0110184 A1* | 8/2002 | Akopian et al. | 375/149 |
| 2003/0197641 A1* | 10/2003 | Stone et al. | 342/357.15 |
| 2005/0216210 A1 | 9/2005 | Bartone et al. | |
| 2009/0161736 A1* | 6/2009 | Sullivan | 375/150 |
| 2010/0061427 A1* | 3/2010 | Lopez-Risueno et al. | 375/150 |
| 2011/0200074 A1* | 8/2011 | Crosta et al. | 375/147 |
| 2011/0285586 A1 | 11/2011 | Ferguson | |
| 2013/0039392 A1* | 2/2013 | Chu et al. | 375/150 |
| 2015/0036724 A1* | 2/2015 | Van Dierendonck et al. | 375/147 |

OTHER PUBLICATIONS

Closas Gómez, P., "Bayesian signal processing techniques for GNSS receivers: from multipath mitigation to positioning," Doctoral Thesis, Universitat Politècnica de Catalunya. Departament de Teoria del Senyal i Comunicacions, Jun. 15, 2009.

Raquet, J., "Development of a Method for Kinematic GPS Carrier-Phase Ambiguity Resolution Using Multiple Reference Receivers," Doctoral Thesis, University of Calgary, Department of Geomatics Engineering, May 1998.

Dainty et al., "Improving Geostationary Satellite GPS Positioning Error Using Dynamic Two-Way Time Transfer Measurements," 39th Annual Precise Time and Time Interval (PTTI) Meeting, Paper 46, Long Beach, CA, Nov. 26-29, 2007.

Raquet et al., "Non-GNSS Radio Frequency Navigation," IEEE International Conference on Acoustics, Speech, and Signal Processing (ICASSP 2008), Las Vegas, NV, Mar. 30-Apr. 4, 2008.

Pedrós, R., "Galileo Signal Generation—Simulation Analysis," University of Limerick, Department of Computer and Electronic Engineering, Apr. 2009.

Richert, T, "The Impact of Future Global Navigation Satellite Systems on Precise Carrier Phase Positioning," Masters Thesis, University of Calgary, Department of Geomatics Engineering, May 2005.

Misra et al., "Global Positioning System: Signals, Measurements, and Performance," 2d Ed., Chapter 10, Lincoln, MA, Ganga-Jamuna Press, 2006.

A. J. Van Dierendonck, "GPS Receivers," in Global Positioning System: Theory and Applications, vol. 1, pp. 349-407, ed. B. Parkinson, J. Spilker, P. Alexrad, and P. Enge, Washington, DC, AIAA, 1996.

* cited by examiner

|  | 40dB-Hz | 45dB-Hz | 50dB-Hz | NO NOISE |
|---|---|---|---|---|
| 1-BIT | 3.534 | 3.500 | 3.254 | 0.269 |
| 4-BIT | -0.175 | -0.170 | -0.146 | 0.001 |
| 8-BIT | -0.170 | -0.160 | -0.155 | -0.005 |
| 16-BIT | -0.161 | -0.141 | -0.155 | -0.004 |
| DOUBLE | 0.000 | -0.036 | -0.035 | -0.004 |

FIG. 14

|  | 40dB-Hz | 45dB-Hz | 50dB-Hz | NO NOISE |
|---|---|---|---|---|
| 1-BIT | 0.933 | 0.569 | 0.301 | 0.008 |
| 4-BIT | 0.418 | 0.355 | 0.331 | 0.007 |
| 8-BIT | 0.392 | 0.356 | 0.336 | 0.008 |
| 0.4000 | 0.400 | 0.342 | 0.338 | 0.007 |
| DOUBLE | 0.229 | 0.207 | 0.172 | 0.007 |

FIG. 15

|  | 40dB-Hz | 45dB-Hz | 50dB-Hz | NO NOISE |
|---|---|---|---|---|
| 1-BIT | -51.2 | 0.3 | 0.6 | 0.2 |
| 4-BIT | -26.0 | 0.5 | 0.2 | -0.0 |
| 8-BIT | -8.6 | 1.6 | -0.1 | -0.1 |
| 16-BIT | 1.8 | 0.1 | 0.3 | -0.1 |
| DOUBLE | -3.9 | -0.0 | 0.4 | -0.1 |

FIG. 16

|  | 40dB-Hz | 45dB-Hz | 50dB-Hz | NO NOISE |
|---|---|---|---|---|
| 1-BIT | 2234 | 68.3 | 33.7 | 4.0 |
| 4-BIT | 591.3 | 50.9 | 29.1 | 4.3 |
| 8-BIT | 461.7 | 49.9 | 29.1 | 4.2 |
| 16-BIT | 290.3 | 49.4 | 27.9 | 4.3 |
| DOUBLE | 143.0 | 51.9 | 28.5 | 4.1 |

FIG. 17

|  | 40dB-Hz | 45dB-Hz | 50dB-Hz | NO NOISE |
|---|---|---|---|---|
| 1-BIT | -17.5 | -14.7 | -14.7 | -14.4 |
| 4-BIT | -14.2 | -15.0 | -14.7 | -14.8 |
| 8-BIT | -12.2 | -14.6 | -15.2 | -14.1 |
| 16-BIT | -15.1 | -14.7 | -15.0 | -15.2 |
| DOUBLE | -14.8 | -14.9 | -15.0 | -14.4 |

FIG. 18

|  | 40dB-Hz | 45dB-Hz | 50dB-Hz | NO NOISE |
|---|---|---|---|---|
| 1-BIT | 117.8 | 12.2 | 10.8 | 10.9 |
| 4-BIT | 44.6 | 12.2 | 12.0 | 11.0 |
| 8-BIT | 44.2 | 12.7 | 12.0 | 11.1 |
| 16-BIT | 35.6 | 11.9 | 12.2 | 11.1 |
| DOUBLE | 26.1 | 11.6 | 11.6 | 10.9 |

FIG. 19

|        | 40dB-Hz | 45dB-Hz | 50dB-Hz | NO NOISE |
|--------|---------|---------|---------|----------|
| 1-BIT  | 1.32    | 0.47    | -0.06   | -0.08    |
| 4-BIT  | -0.08   | 0.18    | -0.13   | -0.04    |
| 8-BIT  | -1.31   | 0.39    | -0.55   | 0.06     |
| 16-BIT | -1.41   | -0.30   | -0.24   | 0.02     |
| DOUBLE | -0.46   | -0.12   | -0.54   | 0.08     |

FIG. 20

|        | 40dB-Hz | 45dB-Hz | 50dB-Hz | NO NOISE |
|--------|---------|---------|---------|----------|
| 1-BIT  | 34.25   | 15.12   | 7.37    | 1.17     |
| 4-BIT  | 29.30   | 18.96   | 16.79   | 1.42     |
| 8-BIT  | 30.06   | 19.43   | 17.02   | 1.86     |
| 16-BIT | 29.90   | 19.20   | 16.70   | 1.26     |
| DOUBLE | 23.89   | 14.96   | 11.89   | 1.42     |

FIG. 21

GLOBAL NAVIGATION SATELLITE SYSTEM SIGNAL DECOMPOSITION AND PARAMETERIZATION ALGORITHM

CROSS-REFERENCE TO RELATED APPLICATIONS

This application claims the benefit of and priority to U.S. Provisional Application Ser. No. 61/660,852, entitled "Global Navigation Satellite System Signal Decomposition and Parameterization Algorithm," filed on Jun. 18, 2012, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention generally relates to Global Navigation Satellite System (GNSS) signals and, more particularly, to signal decomposition for direct and indirect rays present in the GNSS data.

2. Description of the Related Art

Multipath is typically a major source of error in contemporary GNSS systems. Ray models are generally used to describe GPS signals that are received in the presence of multipath propagation effects and white Gaussian noise. Specular reflections in particular are typically described using a ray model. A Multipath Estimating Delay Lock Loop (MEDLL) receiver is a prominent example of a receiver design employed specifically to mitigate the effects of multipath. The MEDLL receiver makes explicit use of multipath parameter estimation and tracking to reduce multipath effects on receiver outputs. MEDLL works by simultaneously estimating parameters for both line-of-sight and multipath signals. There are simultaneously operating tracking loops employed to track each of the signals present, both line-of-sight and multipath.

The mathematics in MEDLL has been described to be akin to performing nonlinear curve fits. A set of reference correlation vectors are generated, each of which has an amplitude, phase, and propagation delay that would be associated with a signal present in received data. Maximum likelihood estimation is then used to obtain multipath signal parameter estimates that minimize the error between received signals and estimated signals generated by the receiver. The number of distinct signals generated within the receiver can be varied, depending on how many multipath signals are detected. MEDLL is perhaps the most prevalent multipath mitigation technique that can be found in GNSS literature in which multipath estimates are explicitly obtained. However, a disadvantage of the conventional MEDLL receiver is a feedback loop, which may improperly bias future loop outputs based on past results that have been erroneously obtained.

Commonly used multipath models do not adequately represent highly complex GNSS signal environments encountered in urban or indoor environments or under foliage. Because of this, a mitigation technique has been developed and verified in the lab, only to be deployed for use unsuccessfully because of the model's lack of adherence to the characteristics of the true environment. This problem may be alleviated through the use of a recording and playback system. A system such as this is used to record real-world GNSS signals, and then replay these recorded signals. This is distinct from a simulator that uses models to construct signals that demonstrate propagation effects that would be present in the channel. The advantage of a recording and playback system is that there is no uncertainty regarding the validity of the effects observed in the recorded signal. The disadvantage of this system is that no models are obtained that can be used in mathematically describing the channel.

Accordingly, there is a need in the art for a modeling system that offers both the advantages of a recording and playback system and a system that uses an analytic model to generate data without the feedback effects seen in a MEDLL receiver.

SUMMARY OF THE INVENTION

Embodiments of the invention provide a method for intra-PIT signal decomposition of a signal received with RF front end hardware. The method begins by aligning a signal received by RF front end hardware into integer multiples of a duration of a pseudorandom noise code sequence. A search grid is computed based on the aligned signal. A plurality of initial ray parameters associated with the computed search grid is coarsely estimated. Using the coarsely estimated plurality of initial ray parameters, a fine estimation of the plurality of initial ray parameters is initiated utilizing stochastic search and optimization techniques. An estimate error is computed for the fine estimation of the plurality of initial ray parameters. Finally, in response to determining a reduction in the computed estimate error, the fine estimation of the plurality of initial ray parameters is removed from the computed search grid.

In some embodiments of the invention, the plurality of initial ray parameters may include amplitude, carrier frequency, Doppler offset, propagation delay, carrier phase, and combinations thereof. In some embodiments, the received signal is a GPS L1 C/A-coded signal.

Other embodiments of the invention provide an apparatus having a RF front end hardware configured to receive, down-convert, and sample a signal. The apparatus further includes a memory and a processor. A program code is resident in the memory and configured to be executed by the processor for intra-PIT signal decomposition of the signal received by the RF front end hardware. The program code is further configured to align the signal into integer multiples of a duration of a pseudorandom noise code sequence, compute a search grid based in the aligned signal, coarsely estimate a plurality of initial ray parameters associated with the computed search grid, use the coarsely estimated plurality of initial ray parameters to initiate fine estimation of the plurality of initial ray parameters utilizing stochastic search and optimization techniques, compute an estimate error for the fine estimation of the plurality of initial ray parameters, and in response to determining a reduction in the computed estimate error, remove the fine estimation of the plurality of initial ray parameters from the computed search grid.

Alternate embodiments of the invention provide a method for intra-PIT signal decomposition of a signal received with RF front end hardware. The method begins by aligning a signal received by RF front end hardware into integer multiples of a duration of a pseudorandom noise code sequence. A search grid is computed based on an integer multiple of the aligned signal. A plurality of initial ray parameters associated with the computed search grid is coarsely estimated. Using the coarsely estimated plurality of initial ray parameters, a fine estimation of the plurality of initial ray parameters is initiated utilizing stochastic search and optimization techniques. A stopping criteria statistic is computed by comparing a peak power of the search grid with a noise power present in the search grid. Finally, in response to determining the stopping criteria statistic is less than a stopping criteria threshold, processing a next integer multiple of the aligned signal.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 14 is a table of mean amplitude error (normalized) for an exemplary embodiment of the invention;

FIG. 15 is a table of standard deviation of the amplitude error (normalized) of the table in FIG. 14;

FIG. 16 is a table of mean frequency offset error for the exemplary embodiment of FIG. 14;

FIG. 17 is a table of standard deviation of the frequency offset error of the table in FIG. 16;

FIG. 18 is a table of mean path length offset error for the exemplary embodiment of FIG. 14;

FIG. 19 is a table of standard deviation of the path length offset error of the table in FIG. 18;

FIG. 20 is a table of mean carrier phase error for the exemplary embodiment of FIG. 14;

FIG. 21 is a table of standard deviation of the mean carrier phase error of the table in FIG. 20;

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Multipath Estimating Delay Lock Loop (MEDLL) receivers are prominent examples of a receiver design employed specifically to mitigate the effects of multipath. The MEDLL receiver makes explicit use of multipath parameter estimation and tracking to reduce multipath effects on receiver outputs. MEDLL works by simultaneously estimating parameters for both line-of-sight and multipath signals. There are simultaneously operating tracking loops employed to track each of the signals present, both line-of-sight and multipath.

Like the MEDLL receiver, the embodiments of the invention set out in more detail below specifically obtain estimates of multipath, as well as line of sight (if available) signals. However, one advantage of the algorithm in the embodiments of the invention over the conventional MEDLL receiver is the absence of any feedback loop which may improperly bias future loop outputs based on past results that have been erroneously obtained. This is because a search space decomposition algorithm is executed independently on search space outputs computed from individual integration periods, similarly to the computations that would be performed in block processing of GNSS signals. The algorithm in the embodiments of the invention is also able to properly characterize more complex signal environments than MEDLL.

In a harsh signal environment where RF propagators, such as reflectors and scatterers, are present in a relative proximity to the GNSS receiver antenna, interference that is generated by these propagators will degrade the integrity of the line-of-sight signal unless the effect of the interference is mitigated. However, because there most likely is a difference in the time of arrival of interfering signals, relative to the line of sight signal, the constituent multipath elements of the received signal can be distinctly observed, using the frequency/code phase search space. Since these signal elements can be separately observed, these elements can then be individually parameterized using a global stochastic search and optimization method, such as simulated annealing or potentially a genetic algorithm.

Figure 1:
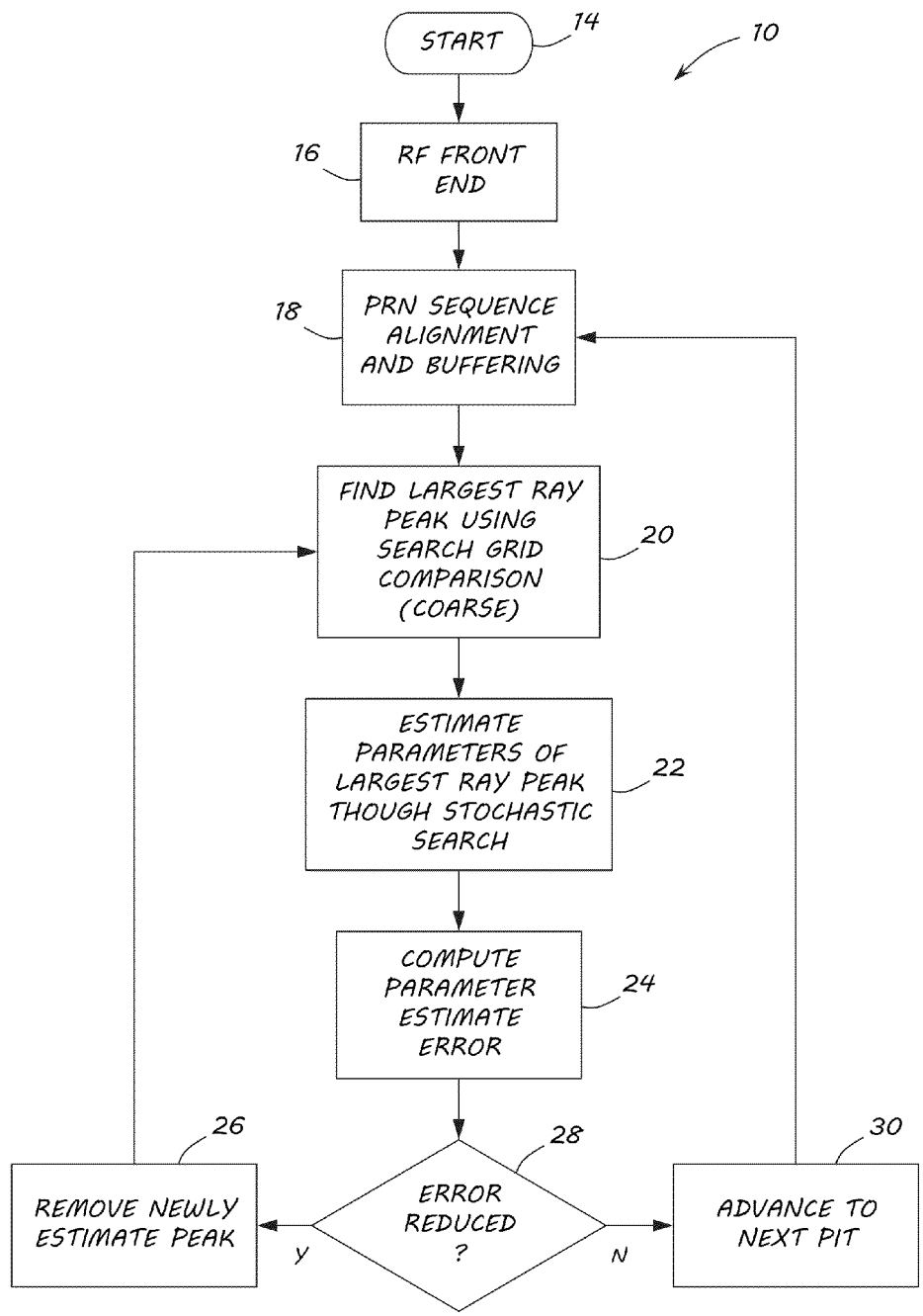
FIG. 1 is a top-level flow chart illustrating a signal decomposition algorithm consistent with embodiments of the invention.

Turning now to the drawings, FIG. 1 illustrates a top-level flowchart 10 of an intra-PIT (pre-detection integration time) signal decomposition algorithm. This figure corresponds directly with a process flowchart 12 illustrated in FIG. 2. The algorithm begins at block 14 of flowchart 10 in FIG. 1. RF front end functions (such as frequency downconversion and signal sampling are performed in block 16. Then, the signal is aligned in block 18 so that data may be processed by a decomposition algorithm in integer multiples of a duration of the pseudorandom noise (PRN) code sequence present in GPS L1 C/A-coded signals, i.e., integer multiples of 1,000 msec. The decomposition algorithm, in some embodiments, may only process whole periods of the PRN code sequence. For example, in a particular embodiment, a PIT-sized data vector is processed, where the first sample in the data vector is from the first chip in the PRN sequence, and the last sample in the vector is from the last chip in the PRN sequence. Other embodiments may utilize decomposition algorithms that process PRN code sequences using other data sizes. Once alignment takes place, received data that is sized to be of PIT-sized duration is input for search grid computation and initial ray parameter estimation in block 20. The amplitude, the carrier frequency Doppler offset, the propagation delay, and the carrier phase are coarsely estimated. These coarse parameter estimates may then be used to initiate fine estimation of these four parameters for a ray using a stochastic search and optimization technique (simulated annealing, for example) in block 22. The error of the parameter estimates is then computed in block 24, and the portion of the search grid associated with the estimated parameters is removed from the search grid in block 26 ("Yes" branch of decision block 28). The remainder of the search grid is then input into the process to obtain another ray estimate at block 20. This continues until there are no more rays to estimate ("No" branch of decision block 28). The next PIT-sized data vector is then input for processing at block 30. This loop takes place until all data is processed and parameterized.

Referring again to FIG. 2, flowchart 12 outlines a process used to estimate the multipath-propagated rays received with a software receiver for some embodiments of the invention. This flowchart 12 involves the execution of several processes, each of which are set out in further detail below. Generally, these processes are as follows: downconversion of received data to an intermediate frequency, sampling of data, buffering of code-aligned data, computation of the search grid from received data, estimation of initial parameters, computation of the initial amplitude estimate, decomposition of the search space, computation of the estimate search space, comparison of received and estimate search spaces, computation of the estimate error, output of parameters to the ray database, determination of alternate search grid comparison regional maxima to consider, and initial estimation of alternate peak parameters.

For the description of the algorithm implemented in embodiments of the invention, the following model will be used for the continuous time-domain received signal r(t):

$$r(t) = \sum_{m=0}^{M(t)} A_m(t) D(t - \tau_m) x(t - \tau_m) \cos(2\pi (f_{L1} + f_{D_m}(t))t + \phi_{r_m}) + \eta(t) \quad (1)$$

where m is an index of a multipath ray and an LOS ray is a 0th multipath ray (m=0 for the ray assumed to be LOS), M(t) is a number of multipath rays at time t, $A_m(t)$ is a peak amplitude of a signal from the mth ray at time t, $D(t-\tau_m)$ is a value of the navigation data message symbol at time $t-\tau_m$, $\tau_m$ is a propagation delay of the mth ray between a transmitting SV and a receiver, $x(t-\tau_m)$ is a value of a C/A-coded PRN sequence chip value at time $t-\tau_m$, $f_{L1}$ is a center frequency of a GPS L1 band, $f_{D_m}(t)$ is a Doppler frequency offset from the L1 center frequency at time t, $\phi_{r_m}$ is a carrier phase of the mth multipath ray, and $\eta(t)$ is white Gaussian noise that is added to the received LOS and multipath signals at time t. This model will be used to fundamentally describe the signal at entry into the receiver throughout the remainder of this description. It should be understood however, that this model is merely a design choice, chosen for illustration purposes, and that other models may be used in other embodiments.

Figure 2:
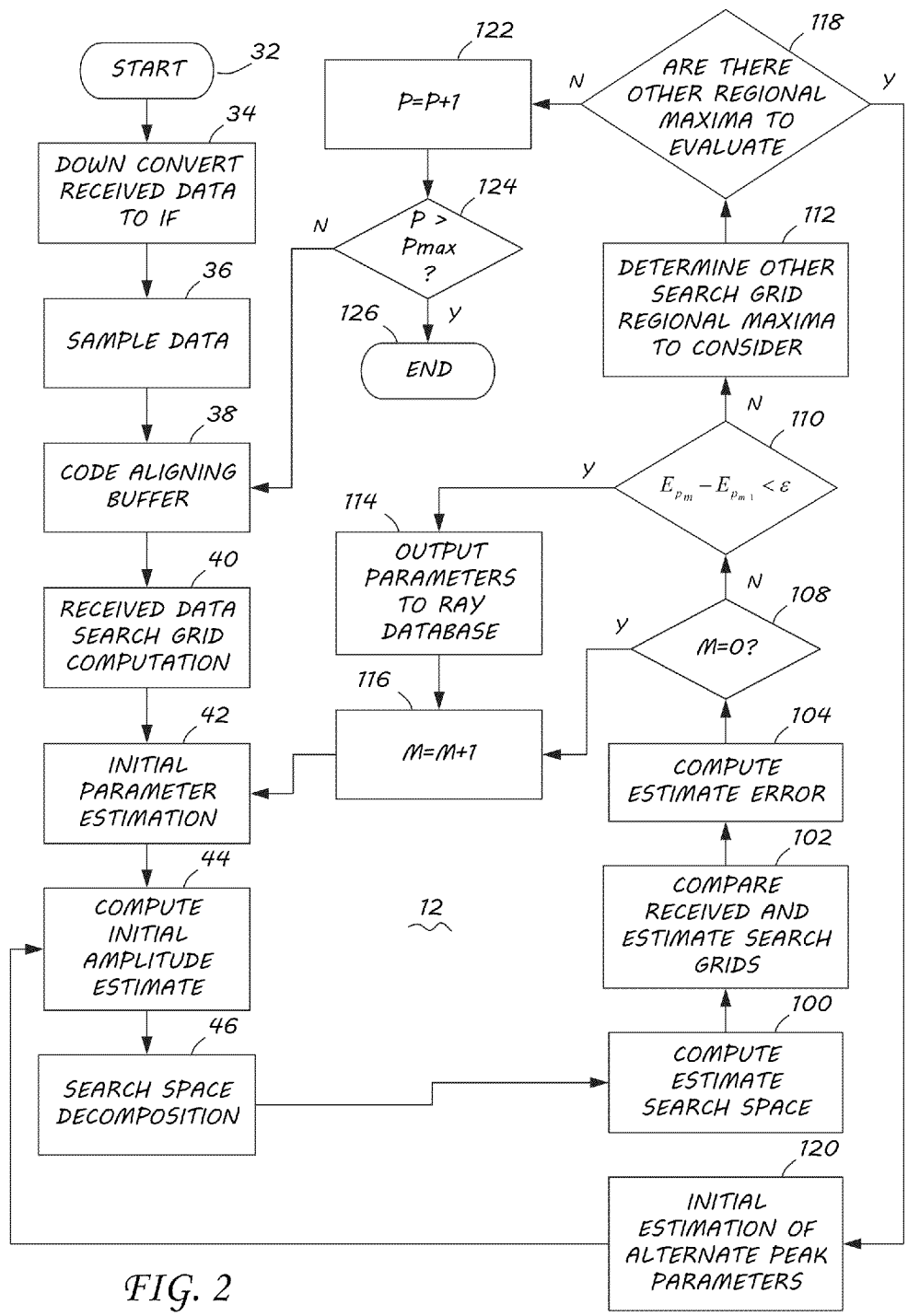
FIG. 2 is a flow chart illustrating a signal parameterization algorithm consistent with embodiments of the invention.

Turning now to flowchart 12 in FIG. 2, the process begins at block 32. Received data is down converted at block 34. This process may be executed in RF front end hardware of a software receiver in some embodiments, though other configurations of the RF front end are also contemplated. The model that is used to describe the output of the downconversion process is presented in further detail as follows. This process accepts r(t) as an input and outputs a downconverted received signal $r_{IF}(t)$ whose band has a center frequency of $f_{IF}$. There are frequencies other than $f_{L1}$ that are available for various GPS users, but for the purposes of this description of the multipath estimation algorithm, only L1 will be considered. The equation used to describe the output of the downconversion process is as follows:

$$r_{IF}(t) = \sum_{m=0}^{M(t)} A_m(t) D(t - \tau_m) x(t - \tau_m) \cos(2\pi (f_{IF} + f_{D_m}(t))t + \phi_m) + \eta(t) \quad (2)$$

where $f_{IF}$ is the intermediate frequency of the receiver, and $\phi_m$ is the carrier phase of the mth multipath ray at the input into the ADC. It is assumed that $r_{IF}(t)$ is filtered using an ideal bandpass filter centered at $f_{IF}$. Both SiGe and TRIGR receivers use an intermediate frequency when outputting downconverted and sampled signals for processing by a user. This process within a software receiver is transparent to the user. Note at this point that the carrier phase of the multipath ray input to the ADC may be completely different from the carrier phase of the original received signal, thus the distinction between $\phi_{r_m}$ in (1) and $\phi_m$ in (2). This does not impact how the signal is processed. Again, the equation above is a model that makes use of the assumption of ideal bandpass filtering in its development, and as with the model for the received signal, other models describing the output of the downconversion process may be used in other embodiments of the invention.

This equation for r(t) sufficiently serves as the model for the TRIGR receiver, but does not describe the model to be used for the SiGe receiver. This is because the TRIGR receiver only processes a real-valued received signal. The SiGe receiver, on the other hand, processes a simultaneous in-phase signal i(t) and quadrature signal q(t). The model to describe continuous time-domain data where in-phase and quadrature signals are both present is as follows:

$$r_{IF}(t) = i(t) + jq(t) + \eta_i(t) + j\eta_q(t) \quad (3)$$

where $j=\sqrt{-1}$. Note the presence of complex-valued noise in this model. This is done to account for the presence of zero-mean white Gaussian noise that is added independently to both the in-phase and quadrature signals. The noise on the in-phase signal and the noise on the quadrature signal is independent of each other, and share the same variance. The continuous time-domain in-phase and quadrature signals i(t) and q(t) may be modeled as follows:

$$i(t) = \sum_{m=0}^{M(t)} A_m(t) D(t - \tau_m) x(t - \tau_m) \cos(2\pi(f_{IF} + f_{D_m}(t))t + \phi_{r_m}) \quad (4)$$

and $$q(t) = \sum_{m=0}^{M(t)} A_m(t) D(t - \tau_m) x(t - \tau_m) \sin(2\pi(f_{IF} + f_{D_m}(t))t + \phi_{r_m}) \quad (5)$$

$r_{if}(t) \in \mathbb{C}$ is now restated using a complex exponential instead of sine and cosine functions:

$$r_{IF}(t) = \quad (6)$$
$$\sum_{m=0}^{M(t)} A_m(t) D(t - \tau_m) x(t - \tau_m) \exp(j(2\pi(f_{IF} + f_{D_m}(t))t + \phi_m)) + \eta_{iq}(t)$$

where $$\eta_{iq}(t) = \eta_i(t) + j\eta_q(t) \quad (7)$$

$r_{if}(t) \in \mathbb{C}$ is further restated by dividing the complex exponential term into two separate terms for the carrier frequency and the carrier phase as follows:

$$r_{IF}(t) = \sum_{m=0}^{M(t)} A_m(t) D(t - \tau_m) x(t - \tau_m) \exp(j(2\pi(f_{IF} + f_{D_m}(t))t)) + \exp(j\phi_{r_m}) + \eta_{iq}(t) \quad (8)$$

After the downconversion process, data is sampled at block 36. This process may also be executed in the front end hardware of the software receiver. The model that is used to describe the output of the sampling process is set out in more detail as follows. This process accepts $r_{IF}(t)$ as an input and outputs a discrete time-domain received signal r[n]. For bookkeeping purposes, the PIT index value will be initialized by asserting that p=0. The equation used to express the sampling of $r_{IF}(t)$, which yields r[n], is as follows.

$$r[n] = r_{IF}(nT_s), n \in \mathbb{N} \quad (9)$$

where n is the sample index and $T_s$ is the sampling period. This process within a software receiver may again be transparent to the user. This yields the following result:

$$r[n] = \left(\sum_{m=0}^{M[n]} A_m[n] D_m[n] x_m[n] f_m[n] \theta_m[n]\right) + \eta[n] \quad (10)$$

$$M[n] = M(nT_s) \quad (11)$$

$$A_m[n] = A_m(nT_s) \quad (12)$$

$$D_m[n] = D(nT_s - \tau_m) \quad (13)$$

$$x_m[n] = x(nT_s - \tau_m) \quad (14)$$

$$f_m[n] = \exp(j(2\pi(f_{IF} + f_{D_m}(nT_s))nT_s)) \quad (15)$$

$$\theta_m[n] = \exp(j\phi_m) \quad (16)$$

$$\eta[n] = \eta_{iq}(nT_s) \quad (17)$$

Note the use of notation where only the discrete-time index is used (as in M[n]), rather than the use of the sampling period multiplied by the discrete-time index (as in $M(nT_s)$). This is to make use of the notation convention to indicate that these equations, as well as subsequent equations that make use of the discrete-time index alone in brackets, compose vectors of values over discrete time instances.

After sampling, the Code-aligned data is buffered in block 38. This process accepts r[n] and p as inputs and outputs a buffered vector of received data $r_p$ of size $N_p$. The code-aligning buffer processes the discrete time-domain received data r[n], where $r[n] \in \{\mathbb{R}, \mathbb{C}\}$, and divides r[n] into vectors of size $N_p$. Therefore, $r_p$ is expressed as follows:

$$r_p = [r[n]]_{n=pN_p}^{N_p-1+pN_p}, p \in \mathbb{N} \quad (18)$$

However, this can be restated as:

$$r_p = \left[\sum_{m=0}^{M[n]} A_m[n] D_m[n] x_m[n] f_m[n] \theta_m[n] + \eta[n]\right]_{n=pN_p}^{N_p-1+pN_p} \quad (19)$$

Because of this, (18) can be restated as a sum of individual vectors as follows:

$$r_p = \sum_{m=0}^{M_p} r_{p_m} + \eta_p \quad (20)$$

where $$r_{p_m} = [A_m[n] D_m[n] x_m[n] f_m[n] \theta_m[n]]_{n=pN_p}^{N_p-1+pN_p} \quad (21)$$

and $$\eta_p = [\eta[n]]_{n=pN_p}^{N_p-1+pN_p} \quad (22)$$

Note this expression is constrained by making the assumption that the number of rays is fixed within one PIT, thus $M_p = M[n] \forall n \in \{pN_p, pN_p+1, \ldots, N_{p-1}+pN_p\}$. (21) may be restated as follows:

$$r_{p_m} = A_{p_m} D_{p_m} x_{p_m} \odot f_{p_m} \theta_{p_m} \quad (23)$$

where $\odot$ denotes a Hadamard product (element-by-element array multiplication). The amplitude $A_{p_m}$ is constrained by assuming that the amplitude for each ray is fixed within one PIT. The same constraining assumption is made for a navigation data message bit value $D_{p_m}$ and the complex exponential carrier phase term $\theta_{p_m}$:

$$A_{p_m} = A_m[n] \forall n \in \{pN_p, pN_p+1, \ldots, N_{p-1}+pN_p\} \quad (24)$$

$$D_{p_m} = D_m[n] \forall n \in \{pN_p, pN_p+1, \ldots, N_{p-1}+pN_p\} \quad (25)$$

$$x_p = [x[n]]_{n=pN_p}^{N_p-1+pN_p} \quad (26)$$

$$f_p = [f[n]]_{n=pN_p}^{N_p-1+pN_p} \quad (27)$$

$$\theta_{p_m} = \theta_m[n] \forall n \in \{pN_p, pN_p+1, \ldots, N_{p-1}+pN_p\} \quad (28)$$

Though not expressed in the equations above, it is assumed that the Doppler frequency offset $f_{D_m}$ for each ray, as used in (15), is fixed within one PIT.

Given the C/A-coded PRN sequence vector b (of size $N_c = 1023$) that is modulated within a GPS waveform to spread the signal spectrum, alignment of the C/A-coded PRN sequence from one PIT p to the next will be forced. This may be accomplished by simply ensuring that the most prominent ray received in $r_{p_m}$, which is assumed to be the LOS ray (denoted with m=0), is output from the code-aligning buffer with the following constraint in place:

$$x_{p_0} = [b_0, \ldots, b_{N_c-1}] \forall p \quad (29)$$

This means that the first element of the coding vector $x_{p_m}$ for the LOS ray would contain the value of the first chip in the C/A-coded PRN sequence vector, and the last element in $x_{p_m}$ would contain the value of the last chip in the sequence vector. This may be difficult in practical processing of data, but it will be assumed that this is the case for this illustrated embodiment.

This aligning function may be performed by simply processing the received GPS data using a simple software receiver, and then tracking points in the signal where $x[n]=b_0$, while $x[n-1]=b_{N_c-1}$.

This function may be performed the same way regardless of the value of PIT p.

After alignment, computation of a search grid from received data may be performed in block 40. This process accepts $r_p$ and $N_p$ as inputs and outputs a search space $R_p$ for the received signal vector $r_p$. The search space may also be referred to here as a search grid. Because the same algorithm will be used for computing the search grid in several instances, with variation potentially in the propagation delay (or alternately path length offset) window size $\tau_{window}$ (or alternately $\delta d_{window}$), the frequency window size $f_{window}$, the propagation delay resolution (or alternately path length offset resolution) $\Delta\tau$ (or alternately $\Delta(\delta d)$) and the frequency resolution $\Delta f$, the "grid" operator will be used to describe the search space operation, which yields an arbitrary search grid S:

$$S = \text{grid}(s, \tau_{window}, f_{window}, \Delta\tau_{input}, \Delta f_{input}) \quad (30)$$

where s is a vector of PIT size that is input into the search space computation operation. The input value $\Delta f_{input}$ is a desired frequency resolution, as defined by a user. The input value $\Delta\tau_{input}$ is a desired propagation delay resolution, as defined by a user. The actual resolution of the search space, in both propagation delay and frequency, will be at least as small as the values input by the user for resolution.

Before detailing how the search grid is computed for the process outlined, it is asserted that the search grid $R_p$ for received PIT sized vector $r_p$ is computed as follows:

$$R_p = \text{grid}(r_p, \tau_{window}, f_{window}, \Delta\tau_{input}, \Delta f_{input}) \quad (31)$$

where $\tau_{window}=2T_c$, $f_{window}=10,000$ kHz, $\Delta\tau_{input}=T_s$, and $\Delta f_{input}=10$ Hz. The chip period $T_c$ is equal to the duration of one chip in the PRN sequence. The sample period $T_s=1/f_s$, where $f_s$ is the sample frequency.

The propagation delay window size $\tau_{window}$ is a user-dictated design choice. The choice of $\tau_{window}=2T_c$ is made for this process in order to obtain estimates of the multipath rays adjacent to the LOS ray, in order to characterize the channel for the local environment around the receiver. Multipath much more prominently affects receiver processing when a multipath ray is received with a propagation delay of less than $T_c$, relative to the LOS ray. Since the delay between the peak of a ray in the search space and the point where the ray is negligible in power is $T_c$, the sum of $T_c+T_c$ is used for the window size. However, this process can easily be executed for any arbitrary choice of propagation delay without requiring any changes to the algorithm. The conversion between $\tau_{window}$ and the path length offset window size $\delta d_{window}$ is as follows:

$$\delta d_{window} = c\tau_{window} \quad (32)$$

where c is the speed of light.

The frequency window size $f_{window}$ is also a user-dictated design choice. The choice of $f_{window}=10,000$ kHz is made for this illustrated embodiment because, as can be found in contemporary literature, Doppler shifts of up to $f_{window}=10,000$ kHz can be observed in received signals, though other window sizes may also be used with other embodiments of the invention.

The propagation delay resolution $\Delta\tau_{input}$ is a user-dictated design choice. The choice of $\Delta\tau_{input}=T_s$ is made because this value of $\Delta\tau$ corresponds with the actual resolution afforded by the sample rate of the receiver. Other propagation rates may also be used to accommodate the resolution of other receivers. The conversion between $\Delta\tau_{input}=T_s$ and the path length offset resolution $\Delta(\delta d)$ is as follows:

$$\Delta(\delta d) = c\Delta\tau \quad (33)$$

The propagation delay resolution $\Delta\tau$ that is actually used in computation of the search grid is to always be at least as small as the resolution specified by the user. The equation for calculation of $\Delta\tau$ is as follows:

$$\Delta\tau = \frac{2\tau_{window}}{N_\tau - 1} \quad (34)$$

where $$N_\tau = 2\left\lceil \max\left(f_s\tau_{window}, \frac{\tau_{window}}{\Delta\tau_{input}}\right) \right\rceil + 1 \quad (35)$$

The frequency resolution $\Delta f$ that is actually used in computation of the search grid is to always exceed the resolution dictated by the user. The smaller the resolution, the better the initial estimate of the Doppler frequency offset that can be made for each ray in the PIT, thus the resolution choice of $\Delta f_{input}=10$ Hz. The search grid may be computed using several methods, generally making use of a fast Fourier transform (FFT). Therefore, the potential use of the FFT will be considered when computing $\Delta f$, but will not be considered when presenting the general form for the search grid in (41) below. The equation for calculation of $\Delta f$ is as follows:

$$\Delta f = \frac{f_s}{N_{fft}} \quad (36)$$

where $$N_{fft} = \max\left(N_s, 2^{\left\lceil \log_2\left(\frac{f_s}{\Delta f_{input}}\right) \right\rceil}\right) \quad (37)$$

where $N_s$ is the size of the data vectors input to the "grid" operation and $\lceil \bullet \rceil$ indicates a ceiling rounding operation (rounding up to the nearest integer on the real number line more than the value contained in the modified brackets). Note that the function expressed with this equation is designed to make use of the computational efficiency afforded the FFT function when input vectors to an FFT function are of a length equal to a power of two.

The fast Fourier transform algorithm "fft" is known in the art and will not be further described, other than to say that the following operator is used to denote the FFT operation, where $s_f$ is the vector output of the FFT operation:

$$s_f = fft(s, N_{fft})_{f \in [f_{low}, f_{high}]} \quad (38)$$

where $N_{fft}$ is the number of points in the input vector in the FFT, and is as expressed in (37). The expression $f \in [f_{low}, f_{high}]$ denotes the range of frequencies, between $f_{Low}$ and $f_{high}$, for which data will be output in $s_f$. Put another way, the vector output from an FFT operation is associated with a range of frequencies as follows: $f \in [-f_s/2, f_s/2]$. The subscript to the fft operator is used to denote that the range of frequency-domain points output in $s_f$ is limited to $[f_{low}, f_{high}]$, rather than the entire range that would be output were the FFT not constrained. The number of points in the FFT whose frequencies are in the range $f \in [f_{low}, f_{high}]$ is denoted $N_f$. The following vector $\gamma$ is defined to be the frequency values for each column in the search space:

$$\gamma = [\gamma_z]_{z=0}^{N_f - 1}, \gamma_z \in [f_{low}, f_{high}] \quad (39)$$

The code delay vector $x_s$ for code delay $\tau_s$ is defined as follows:

$$x_s(\tau_s) = \left[ b \left[ \left[ N_c \left( \frac{\omega T_s + \tau_s}{N_c T_c} - \left\lfloor \frac{\omega T_s + \tau_s}{N_c T_c} \right\rfloor \right) \right] \right]_{\omega=0}^{N_s - 1} \right], b \in \{-1, +1\} \quad (40)$$

where $\tau_s$ is an arbitrary propagation delay input into the expression, $b[\bullet]$ is an element of the PRN sequence vector b designated by the natural number inside the brackets, $\lfloor \bullet \rfloor$ indicates a floor rounding operation (rounding down to the nearest integer on the real number line less than the value contained in the modified brackets), $N_c$ is the number of chips in the PRN sequence, $T_c$ is the chip duration (so $T_c = 0.001/N_c = 0.001/1023$ seconds for GPS C/A code), and $N_s$ is as used in (37).

The search space computation operator "grid" and the output of the "grid" operator, S, is defined as follows, where the "grid" operator for S is first presented in (30) to generally relate the "grid" operator to (31):

$$S = \text{grid}(s, \tau_{window}, f_{window}, \Delta\tau_{input}, \Delta f_{input}) = \quad (41)$$

$$\begin{bmatrix} S(\beta_0, \gamma_0) & S(\beta_0, \gamma_1) & \cdots & S(\beta_0, \gamma_{N_\tau - 1}) \\ S(\beta_1, \gamma_0) & S(\beta_1, \gamma_1) & & S(\beta_1, \gamma_{N_\tau - 1}) \\ \vdots & & \ddots & \vdots \\ S(\beta_{N_\tau - 1}, \gamma_0) & S(\beta_{N_\tau - 1}, \gamma_1) & \cdots & S(\beta_{N_\tau - 1}, \gamma_{N_\tau - 1}) \end{bmatrix}_{N_\tau \times N_f}$$

where $N\tau$ is the size of the vector of code delays considered in S, thus the number of rows in S, and is equal to the size of the following vector $\beta$ defining the code delay values for each row in the search space:

$$\beta = [-\tau_{window}, -\tau_{window} + \Delta\tau, -\tau_{window} + 2\Delta\tau, \ldots, \tau_{window}]^T \quad (42)$$

$$= [[\beta_y]_{y=0}^{N_\tau - 1}]^T \quad (43)$$

To compute $S(\beta_y, \gamma_z)$, the following equation is used:

$$S(\beta_y, \gamma_z) = S_i(\beta_y, \gamma_z) + jS_q(\beta_y, \gamma_z) \quad (44)$$

where $$S_i(\beta_y, \gamma_z) = \sum_{\omega=0}^{N_s - 1} ((\text{Re}(s_\omega)\cos(\phi_{s_\omega}(\gamma_y)) + \text{Im}(s_\omega)\sin(\phi_{s_\omega}(\gamma_y)))x_{s_\omega}(\beta_y)) \quad (45)$$

$$S_q(\beta_y, \gamma_z) = \quad (46)$$

$$\sum_{\omega=0}^{N_s - 1} ((\text{Im}(s_\omega)\cos(\phi_{s_\omega}(\gamma_y)) - \text{Re}(s_\omega)\sin(\phi_{s_\omega}(\gamma_y)))x_{s_\omega}(\beta_y))$$

and $$\phi_{s_\omega}(\gamma_y) = 2\pi(f_{IF} + \gamma_y)T_s\omega \quad (47)$$

Returning to flowchart 12 in FIG. 2, estimation of initial parameters is then performed in block 42. This process accepts $R_p$ as an input and outputs an initial estimate of the Doppler frequency offset $\tilde{f}_{p_m}$, an initial estimate of the propagation delay $\tilde{\tau}_{p_m}$, and an initial estimate of the carrier phase $\tilde{\phi}_{p_m}$. Additionally, in the case where the ray index m>0, $\hat{R}_{p_{m-1}}$ is additionally input. $\hat{R}_{p_m}$ is a search grid computed from the summation of discrete time-domain vectors associated with all previously obtained ray estimates. $\hat{R}_{p_m}$ contains aggregated search grid information for m previously obtained ray estimates.

In the discussion of the computation of the search grid above, the number of rows in the search space matrix $R_p$ is established to be $N_\tau$ and the number of columns in $R_p$ to be $N_f$. $\hat{R}_{p_{m-1}}$ is additionally asserted in this process is of the same size, and that the frequency and code phase values of element positions shared between the two matrices are the same. The comparison matrix $\chi_{p_m}$ is now defined as follows:

$$\chi_{p_m} = \begin{cases} R_p - \hat{R}_{p_m}, & m > 0 \\ R_p, & m = 0 \end{cases} \quad (48)$$

Defining $\chi_{p_m}$ as shown in (48) simply provides a means by which the received search space is compared with the most recently computed search space of the sum of estimated multipath rays. As the number of rays in $\hat{R}_{p_{m-1}}$ increases, the average magnitude of each element of $\chi_{p_m}$ should decrease, if multipath ray estimates are properly obtained. Given the size of $R_p$ and $\hat{R}_{p_{m-1}}$, it is also known that the size of $\chi_{p_m}$. The indices y and z are used to denote the row number and the column number, respectively, for each element in each of these three matrices.

To obtain initial estimates for the Doppler frequency offset $\tilde{f}_{p_m}$, the propagation delay $\tilde{\tau}_{p_m}$, and the carrier phase $\tilde{\phi}_{p_m}$, the following operation is first executed:

$$(y_{peak}, z_{peak}) = \underset{y,z}{\text{argmax}}\{|\chi(y, z)|\}_{y=0}^{N_\tau - 1}\}_{z=0}^{N_f - 1} \quad (49)$$

The following three equations are now used to obtain $\tilde{f}_{p_m}$, $\tilde{\tau}_{p_m}$, and $\tilde{\phi}_{p_m}$:

$$\tilde{f}_{p_m} = \beta_{y_{peak}} \quad (50)$$

$$\tilde{\tau}_{p_m} = \gamma_{z_{peak}} \quad (51)$$

$$\tilde{\phi}_{p_m} = \angle \chi(y_{peak}, z_{peak}) \quad (52)$$

where $\angle$ denotes the phase angle computation, which is the same as the four quadrant arctangent operation $\tan^{-1}(\text{imag}(\chi(y_{peak}, z_{peak}))/\text{real}(\chi(y_{peak}, z_{peak})))$.

Next a computation of an initial amplitude estimate is performed in block 44. This process accepts $\tilde{f}_{p_m}$, $\tilde{\tau}_{p_m}$, and $\tilde{\phi}_{p_m}$ as inputs and outputs an initial estimate of the peak amplitude of the ray being considered, $\tilde{A}_{p_m}$. The initial amplitude is obtained through the use of known linear regression algorithms that have been found to sufficiently estimate the peak amplitude of the ray of interest, m.

The search space is decomposed in block 46. This process accepts $\tilde{A}_{p_m}$, $\tilde{f}_{p_m}$, $\tilde{\tau}_{p_m}$, and $\tilde{\phi}_{p_m}$ as inputs and outputs a vector containing a waveform design making use of the parameter estimates for ray m, $\hat{r}_{p_m}$, to the process used to compute the search space for the estimate as set forth in further detail below. The final parameters associated with $\hat{r}_{p_m}$ are the peak amplitude estimate $\tilde{A}_{p_m}$, the frequency estimate $\hat{f}_{p_m}$, the propagation delay estimate $\hat{\tau}_{p_m}$, and the carrier phase estimate $\hat{\phi}_{p_m}$ and are output to the ray database as also set forth in further detail below.

Figure 3:
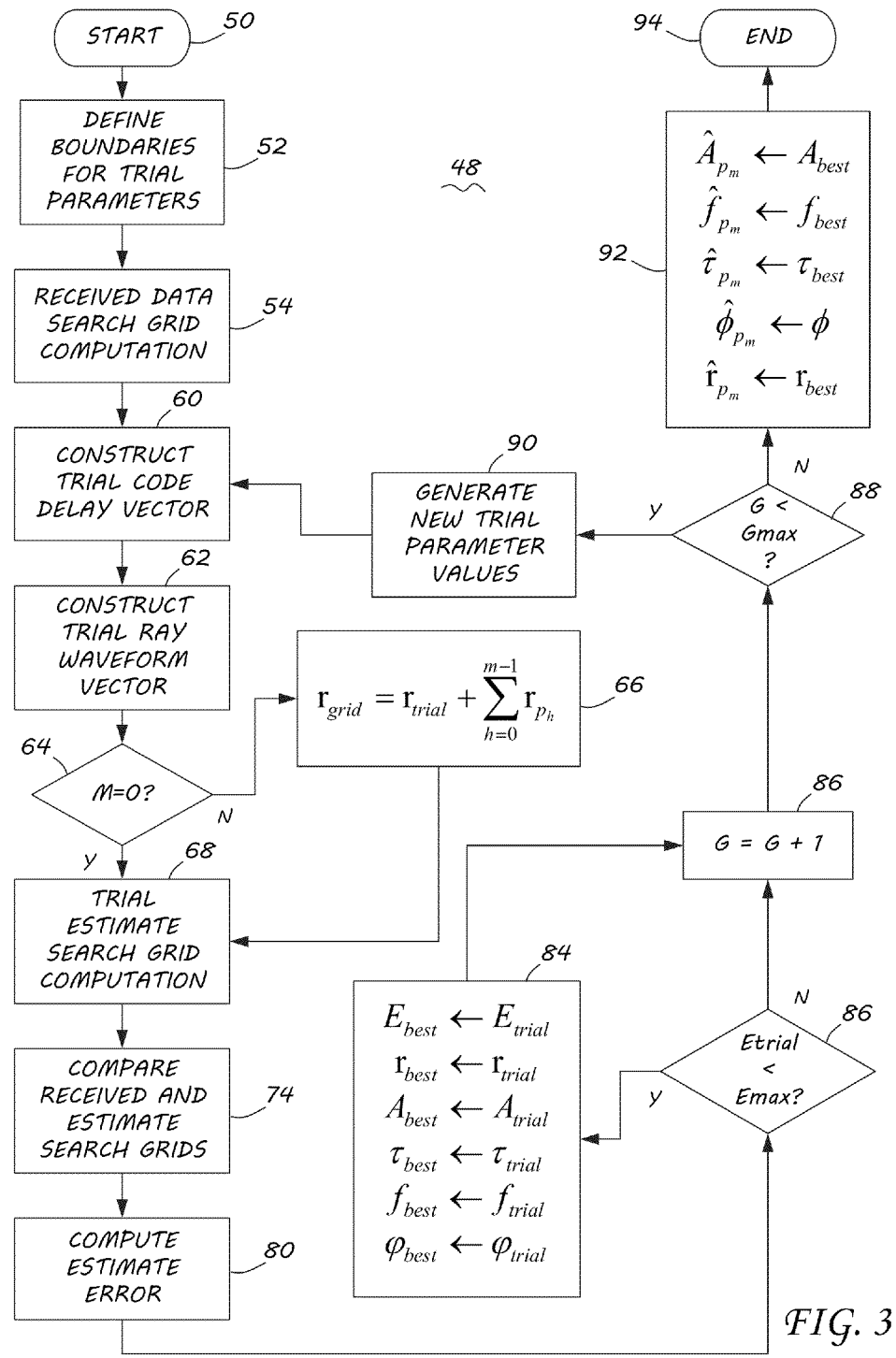
FIG. 3 is a flow chart illustrating a search space decomposition process consistent with embodiments of the invention.

FIG. 3 illustrates a flowchart 48 outlining a process used to decompose the search space. This flowchart 48 begins at block 50 and involves the execution of several subprocesses. Generally, these subprocesses include: defining of the boundaries for the ranges of trial parameter values, computation of the search grid for received data that will be used in the decomposition subprocess, construction of the code delay vector that will be used in designing the trial ray waveform, construction of the trial ray waveform, computation of the search grid resulting from addition of the trial ray waveform with previously obtained multipath ray estimates, comparison of the received search grid with the search grid computed using estimated and trial parameters, computation of the error using the trial parameters as estimates of the multipath ray parameters of interest, and generation of new trial parameters.

Boundaries are defined for trial parameters in block 52. This subprocess accepts $\tilde{A}_{p_m}$, $\tilde{f}_{p_m}$, $\tilde{\tau}_{p_m}$, and $\tilde{\phi}_{p_m}$ as inputs and outputs boundary values (both minimum and maximum) for the trial parameters of the ray being considered. Parameter boundaries are output for the peak amplitude ($A_{min}$ and $A_{max}$), the carrier frequency ($f_{min}$ and $f_{max}$), the propagation delay ($\tau_{min}$ and $\tau_{max}$), and the carrier phase ($\phi_{min}$ and $\phi_{max}$). Also made available from previous processes are $r_p$ and $N_p$.

This subprocess is used to simply define the ranges from which trial parameters for the peak amplitude $A_{trial}$, the carrier frequency $f_{trial}$, the propagation delay $\tau_{trial}$, and the carrier phase $\phi_{trial}$ in the decomposition process may be obtained. These ranges are defined as follows:

$$A_{trial} \in [A_{min}, A_{max}] \quad (53)$$

$$f_{trial} \in [f_{min}, f_{max}] \quad (54)$$

$$\tau_{trial} \in [\tau_{min}, \tau_{max}] \quad (55)$$

$$\phi_{trial} \in [\phi_{min}, \phi_{max}] \quad (56)$$

In this illustrated embodiment of the invention, these boundaries are defined as follows: $A_{min}=0$ and $A_{max}=\max\{|r_p|\}$. This range is set to simply dictate in generation of trial parameters that the peak amplitude of the ray waveform must not be outside the range of possible values found in the received data vector. Because of the signal to noise ratio of GPS data recorded using a SiGe or TRIGR receiver, this range is appropriate, since peak noise amplitude values will almost certainly exceed the peak amplitude of a GPS waveform. For some simulation circumstances, however, $A_{max}$ may need to be modified. The carrier frequency trial parameter range boundaries are $f_{min}=\tilde{f}_{p_m}-500+\Delta f$ and $f_{max}=\tilde{f}_{p_m}+500-\Delta f$. A safety margin of $\Delta f$ is used to bound estimates to within (but not including) a 1 kHz null-to-null bandwidth of a GPS L1 signal. The range of approximately −500 to 500 Hz around the initial estimate $\tilde{f}_{p_m}$ is used because the absolute difference between two GPS waveform frequency responses reach a peak at approximately 500 Hz. The propagation delay trial parameter range boundaries are $\tau_{min}=\tilde{\tau}_{p_m}-T_c+\Delta\tau$ and $\tau_{max}=\tilde{\tau}_{p_m}+T_c-\Delta\tau$. A safety margin of $\Delta\tau$ is used to bound estimates to within (but not including) a chip duration of a GPS L1 signal. The carrier phase trial parameter range boundaries are $\phi_{min}=-2\pi$ and $\phi_{max}=2\pi$. This range is chosen to ensure the true value of the carrier phase falls in the range, and to account for the circular, rather than linear, nature of carrier phase values (a carrier phase of $-\pi$ is equal to a carrier phase of $\pi$).

Figure 4A:
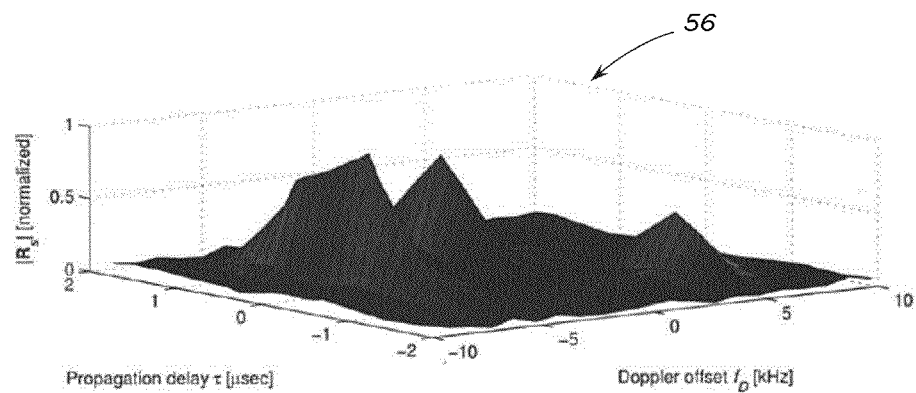
FIG. 4A is an illustration of a magnitude of points in a search grid for simulated received data.
Figure 4B:
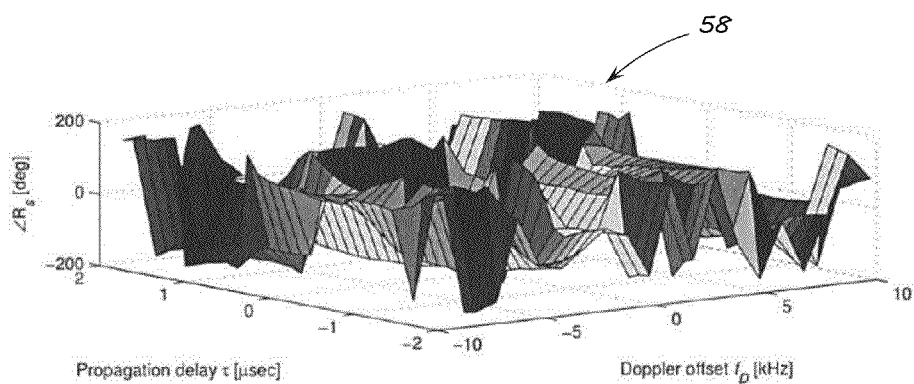
FIG. 4B is an illustration of a related phase of the points in FIG. 4A.

A received data search grid computation is then made in block 54. This subprocess accepts $r_p$ and $N_p$ as inputs and outputs a search grid to be used in the search space decomposition $R_s$. Additional outputs of this subprocess are initial values for a trial iteration index $g=0$ and a best error computation, $E_{best}=\infty$. Graph 56 in FIG. 4A illustrates the magnitude of the points and graph 58 in FIG. 4B illustrates the phase of the points in the search grid for simulated received data $R_s$.

Note that $R_s$ is distinct from $R_p$. This is a design choice that has been made for this illustrated embodiment, as the initial estimate used in the search space decomposition process is required to be relatively accurate, thus the use of a high resolution. The search grid $R_s$ is used to obtain the estimate for the key parameters in an iterative process. The smaller the resolution of the search grid, the greater the computational requirement. Therefore, construction of these two search grids is decoupled to ensure the simultaneous accuracy of initial estimates while still retaining an ability to perform the search space decomposition in a reasonable timeframe.

The search grid $R_s$ used in a stochastic search process is computed as follows:

$$R_S = \text{grid}(r_p, \tau_{window}, f_{window}, \Delta\tau_{input}, [\Delta f_s]_{N_{ff}=N_p}) \quad (57)$$

where $\tau_{window}=2T_c$ (as before), $f_{window}=10{,}000$ kHz (as before), $\Delta\tau_{input}=T_s$ (as before), and the frequency resolution $\Delta f_s$ is such that the number of points in an FFT used to compute the search grid is equal to $N_p$. Eq. 36 is used in the computation of $\Delta f_s$. The number of code delay values, thus the number of rows in the search grid, remains $N_\tau$. The number of frequency values, thus the number of columns in the search grid, is denoted $N_f$.

Returning to FIG. 3, next a trial code delay vector is constructed in block 60. This subprocess accepts $R_s$, g, and $E_{best}$ as inputs and outputs a code delay vector $x_{trial}$. This subprocess additionally accepts $A_{trial}$, $f_{trial}$, $\tau_{trial}$, and $\phi_{trial}$ in instances where g>0. From this point forward, the following trial parameters are defined as follows, for cases when g=0:

$$A_{trial} = \tilde{A}_{p_m} \quad (58)$$

$$f_{trial} = \tilde{f}_{p_m} \quad (59)$$

$$\tau_{trial} = \tilde{\tau}_{p_m} \quad (60)$$

$$\phi_{trial} = \tilde{\phi}_{p_m} \quad (61)$$

For cases when g>0, the initial estimates for the four parameters are no longer used, making use only of the trial parameters generated in the subprocess described in further detail below.

$x_{trial}$ is computed using Eq. 40, where $\tau_s$ in Eq. 40 is as follows: $\tau s = \tau_{trial}$. $N_s$ in Eq. 40 is set equal to $N_p$.

Next a trial ray waveform vector is constructed in block 62. This subprocess accepts $x_{trial}$ as an input and outputs a trial ray waveform vector $r_{trial}$, as well as a cumulative discrete-time waveform containing a summation of the trial ray waveform with all previously obtained multi path ray estimates, $r_{grid}$. $r_{trial}$ is computed using Eq. 23, where $A_{p_m}=A_{trial}$, $D_{p_m}=1$, $x_{p_m}=x_{trial}$, $f_{p_m}=f_{trial}$, and $\phi_{p_m}=\exp(j\phi_{trial})$. The trial carrier frequency vector $f_{trial}$ is defined as follows:

$$f_{trial}=[\exp(j2\pi f_{trial}\omega T_s)]_{\omega=0}^{N_p-1} \quad (62)$$

$r_{trial}$ must be considered for instances when the received and recorded data is real-valued ($r_p \in \mathbb{R}$) versus when the recorded data is complex-valued ($r_p \in \mathbb{C}$). The use of Eq. 23 applies directly when $r_p \in \mathbb{C}$. If $r_p \in \mathbb{R}$, $r_{trial}$ is expressed as follows:

$$r_{trial}=Re\{r_{trial}\}, r_p \in \mathbb{R} \quad (63)$$

The decision point "m=0" in decision block 64 is used to determine whether or not the ray waveforms from previous estimates should be added to the trial waveform $r_{trial}$. If m=0 ("Yes" branch of decision block 64), then it is assumed the LOS ray is being addressed. If another ray in the PIT is being addressed, then it is assumed a non-LOS ray is being addressed, and m>0. However, each ray estimate must be considered to reduce the difference between $R_p$ and the estimate. Therefore, the waveforms generated using previous ray estimates (resulting from previous iterations of the decomposition process illustrated in FIG. 2) must be added to the current ray waveform, in order to obtain an accurate estimate of the current ray parameters. Therefore, if m>0 ("No" branch of decision block 64), the following operation is executed in block 66, corresponding with the subprocess named for the following equation, and addressed earlier:

$$r_{grid} = r_{trial} + \sum_{h=0}^{m-1} r_{p_h}, m > 0 \quad (64)$$

If m=0, the following is true:

$$r_{grid}=r_{trial}, m=0 \quad (65)$$

Figure 5A:
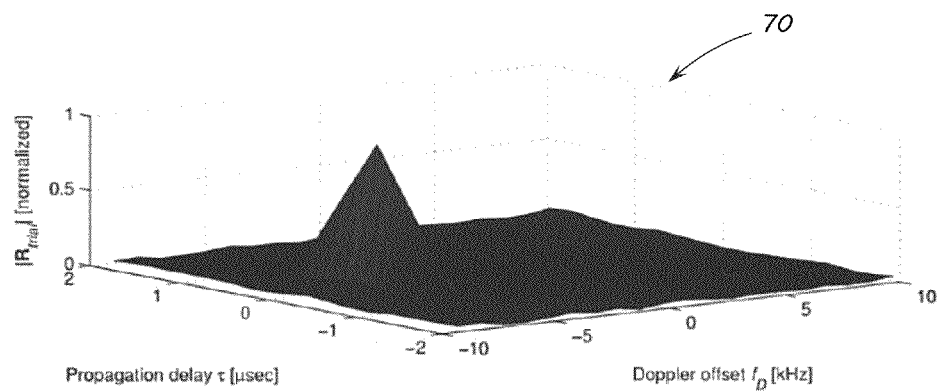
FIG. 5A is an illustration of a magnitude of points in a search grid for a trial estimate.
Figure 5B:
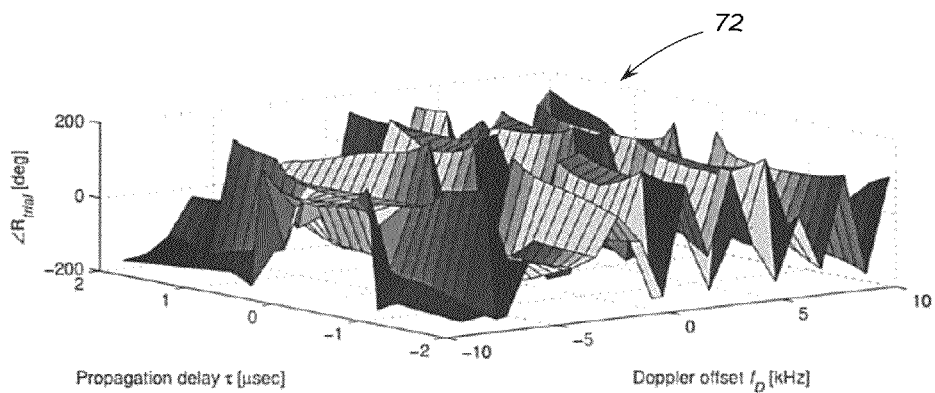
FIG. 5B is an illustration of a related phase of the points in FIG. 5A.

A trial estimate search grid computation is performed after the construction of the trail ray waveform vector in block 62 if m=0 or after the operation in block 66 if m≠0. This subprocess accepts $r_{grid}$ as an input and outputs the search grid for the trial estimate $R_{trial}$. Graph 70 in FIG. 5A illustrates the magnitude of the points and graph 72 in FIG. 5B illustrates the phase of the points in the search grid for the trial $R_{trial}$.

The search grid is computed as follows:

$$R_{trial}=\text{grid}(r_{grid}, \tau_{window}, f_{window}, \Delta\tau_{input}, [\Delta f_s]_{N_{ff}=N_p}) \quad (66)$$

Figure 6A:
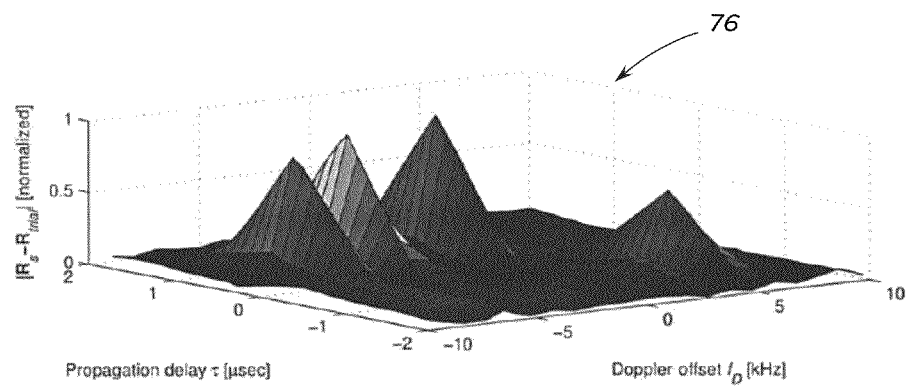
FIG. 6A is an illustration of a magnitude of points in a search grid for a difference between a received signal and a trail signal.
Figure 6B:
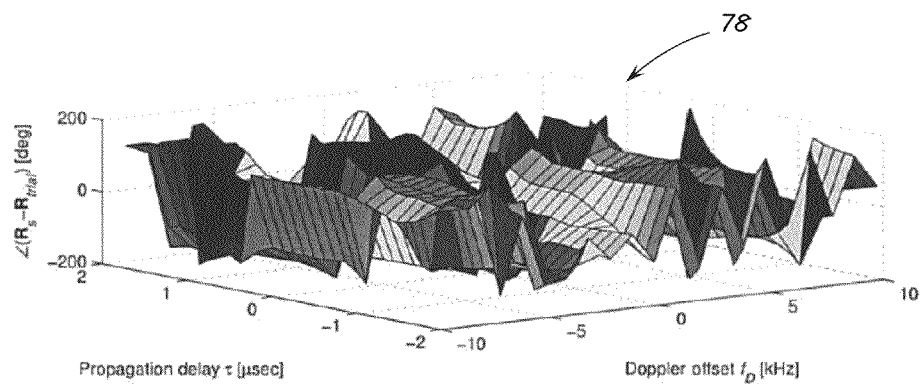
FIG. 6B is an illustration of a related phase of the points in FIG. 6A.

Received and estimate search grids are then compared in block 74. This subprocess accepts $R_{trial}$ as an input and outputs a comparison matrix $\chi_{trial}$. Graph 76 in FIG. 6A illustrates the magnitude of the points and graph 78 in FIG. 6B illustrates the phase of the points in the search grid for the difference between the received signal and the trial, $\chi_{trial}$.

$\chi_{trial}$ is computed using the following equation:

$$\chi_{trial}=R_s-R_{trial} \quad (67)$$

Returning again to FIG. 3, estimate Error is then computed in block 80. This subprocess accepts $\chi_{trial}$ as an input and outputs a ray estimate error $E_{trial}$ associated with the trial parameters. $E_{trial}$ is computed using the following equation:

$$E_{trial} = \frac{1}{N_\tau N_{fs}} \sum_{y=0}^{N_\tau-1} \sum_{z=0}^{N_{fs}-1} |\chi_{trial}(y,z)|^2 \quad (68)$$

The decision point "$E_{trial}<E_{max}$" in decision block 82 is used to determine whether or not the current error $E_{trial}$ is superior to previous error values. If this is the case ("Yes" branch of decision block 82), the parameters for the best estimate are asserted as the current parameters in the subsequent subprocess in block 84 and denoted "$E_{best}\leftarrow E_{trial}$, $r_{best}\leftarrow r_{trial}$, $A_{best}\leftarrow A_{trial}$, $\tau_{best}\leftarrow \tau_{trial}$, $f_{best}\leftarrow f_{trial}$, $\phi_{best}\leftarrow \phi_{trial}$".

The iteration index g is incremented in the process that follows these operations in block 86.

The decision point "$g<g_{max}$" in decision block 88 is used to determine whether further iterations of trial parameter generation and comparison with received data shall take place. If $g<g_{max}$ ("Yes" branch of decision block 88), then further iterations occur at block 90. Otherwise ("No" branch of decision block 88), the best estimates are asserted as the final parameters in block 92 and the process ends at block 94. In this illustrated embodiment, the number of iterations used is typically $g_{max}=1000$ when using simulated annealing to generate new trial parameter values, though $g_{max}=1000$ is an arbitrary value typically used for the number of iterations in generic simulated annealing literature. If other methods are used for stochastic search and estimation in other embodiments, a convergence threshold may be used instead.

The process to assert the best estimates as the final estimates, as discussed earlier, is denoted "$\hat{A}_{p_m}\leftarrow A_{best}$, $\hat{f}_{p_m}\leftarrow f_{best}$, $\hat{\tau}_{p_m}\leftarrow \tau_{best}$, $\hat{\phi}_{p_m}\leftarrow \phi_{best}$". Note that final estimate values will always be output from the search space decomposition process, regardless of the quality of the estimate.

Figure 7:
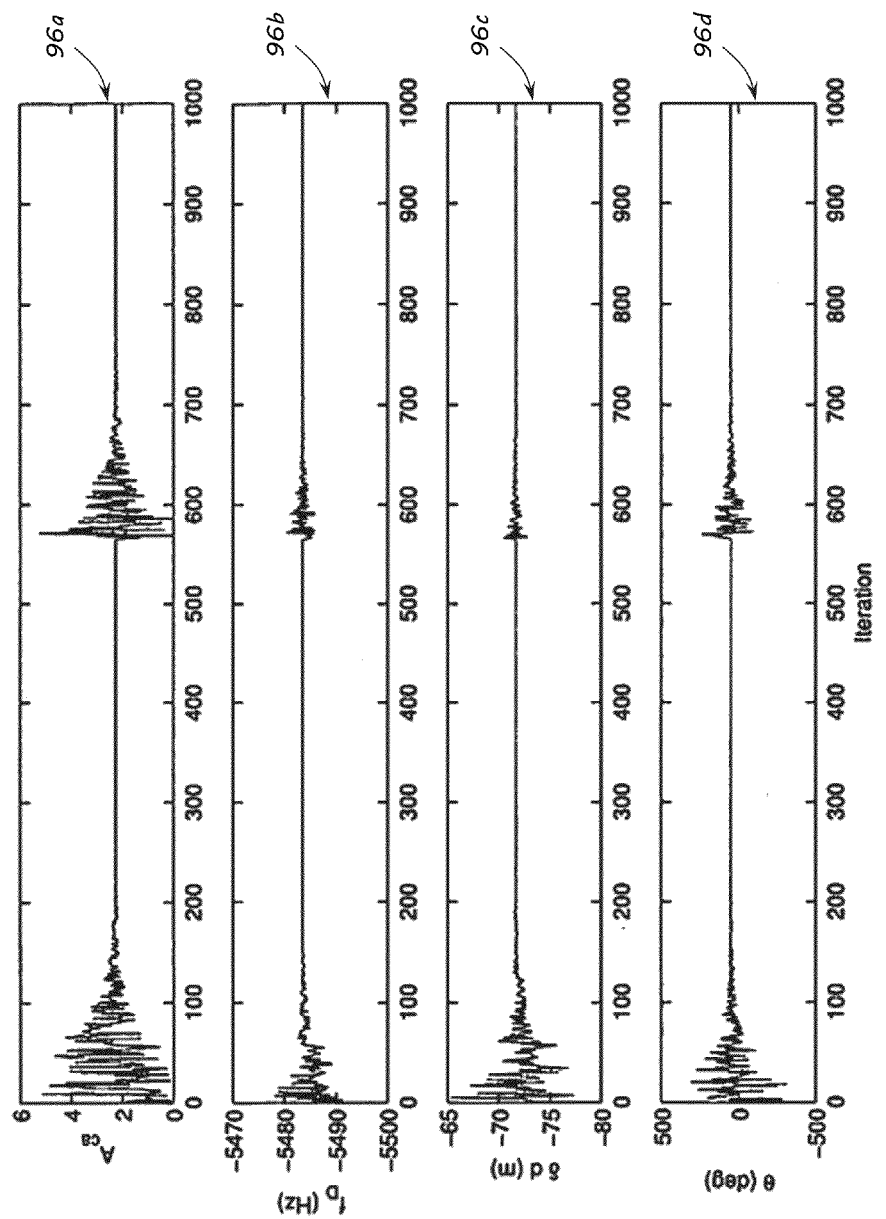
FIG. 7 is an illustration of a set of various trial parameters generated using a simulated annealing process consistent with embodiments of the invention.
Figure 8:
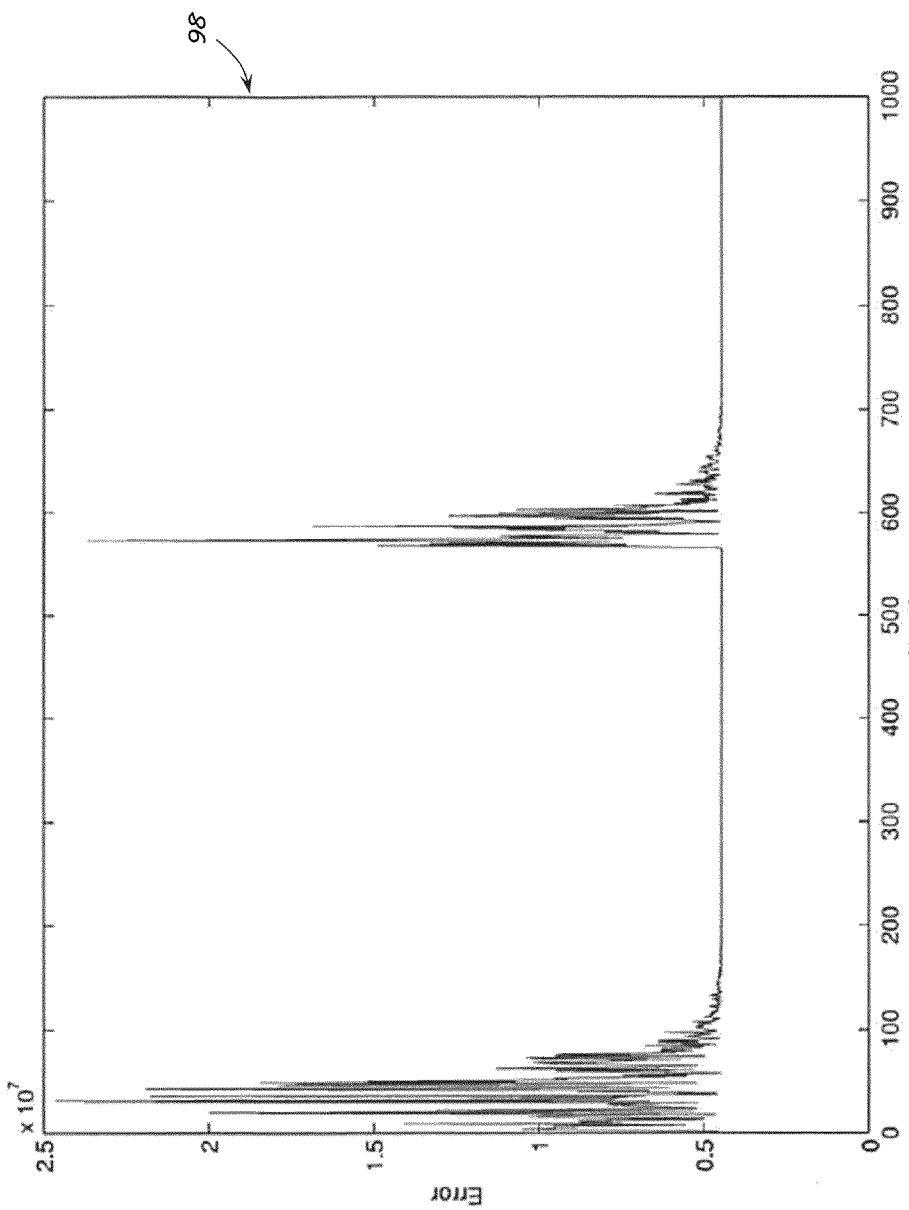
FIG. 8 is an illustration of errors associated with various trial parameters illustrated in FIG. 7.

Graphs 96a-96b, 96c, and 96d in FIG. 7 illustrate a set of various trial parameters generated using the simulated annealing process, as described below. Note that the use of reannealing between iterations 600 to 700. Reannealing is a restarting of the annealing process to test whether the global optimum is reached in earlier iterations. Graph 98 in FIG. 8 illustrates the error associated with each set of these trial parameters.

New trial parameter values are generated in block 90. This subprocess accepts g as an input and outputs new values of $A_{trial}$, $f_{trial}$, $\tau_{trial}$, and $\phi_{trial}$. There are different means by which to compute trial parameters, depending on the stochastic search and optimization method used. This illustrated embodiment utilizes simulated annealing for selection of trial parameters. There may, however, be other stochastic search and optimization techniques that may be employed for more accurate or efficient performance of the algorithm that may be used in other embodiments of the invention.

Simulated annealing is made available to users practically in the MATLAB® global optimization toolbox, and has been employed in this illustrated embodiment to serve as the computational backbone for trial parameter generation. Specific simulated annealing parameters associated with the generation of initial research findings will be outlined with the results.

Returning now to FIG. 2, the estimate search space may now be computed in block 100. This process accepts $\hat{r}_{p_m}$ as an input and outputs an estimate search grid $\hat{R}_{p_m}$. The input $\hat{r}_{p_m}$ is output from the search space decomposition process outlined above and illustrated in FIG. 3.

The search grid is computed using the following equation:

$$\hat{R}_{P_m} = \text{grid}\left(\sum_{h=0}^{m} \hat{r}_{P_h}, \tau_{window}, f_{window}, \Delta\tau_{input}, \Delta f_{input}\right) \quad (69)$$

Note with this operation that the search grid obtained using the sum of all ray waveforms must be computed.

After the computation of the estimate search space, a comparison of received and estimate search spaces is performed in block 102. This process accepts $\hat{R}_{P_m}$ as an input and outputs a comparison matrix $\chi_{P_m}$. The equation used to compute $\chi_{P_m}$ is as follows:

$$\chi_{P_m} = R_{P_m} - \hat{R}_{P_m} \quad (70)$$

This process is executed distinctly from the comparison subprocess described in conjunction with block 74 of FIG. 3 as part of the search space decomposition process. While the result of the comparison process in block 74 of FIG. 3 would yield a similar result, the process described above in conjunction with block 102 is different in that the search grids denoted $\chi_{P_m}$, $R_{P_m}$, and $\hat{R}_{P_m}$ may use a different propagation delay resolution $\Delta\tau$ and a different frequency resolution $\Delta f$ from that used in block 74 of FIG. 3.

Figure 9:
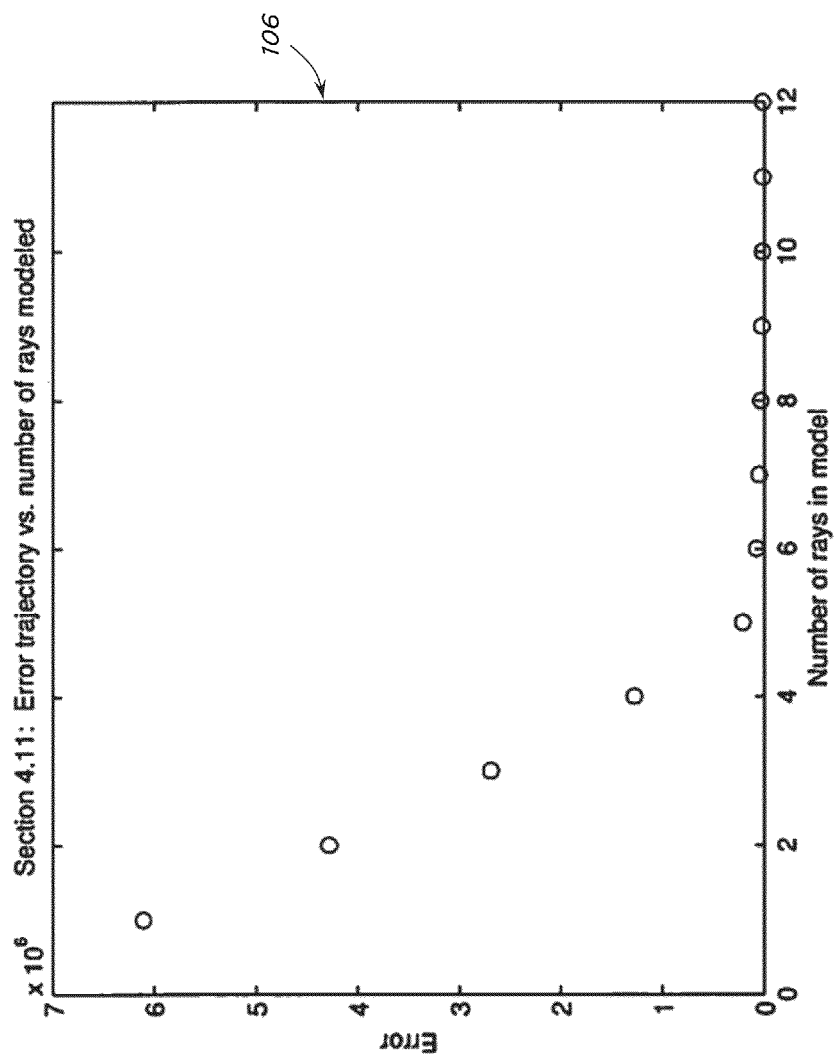
FIG. 9 is an illustration of a trajectory of errors associated with an addition of parameter estimates in an exemplary embodiment of the invention.
Figure 10:
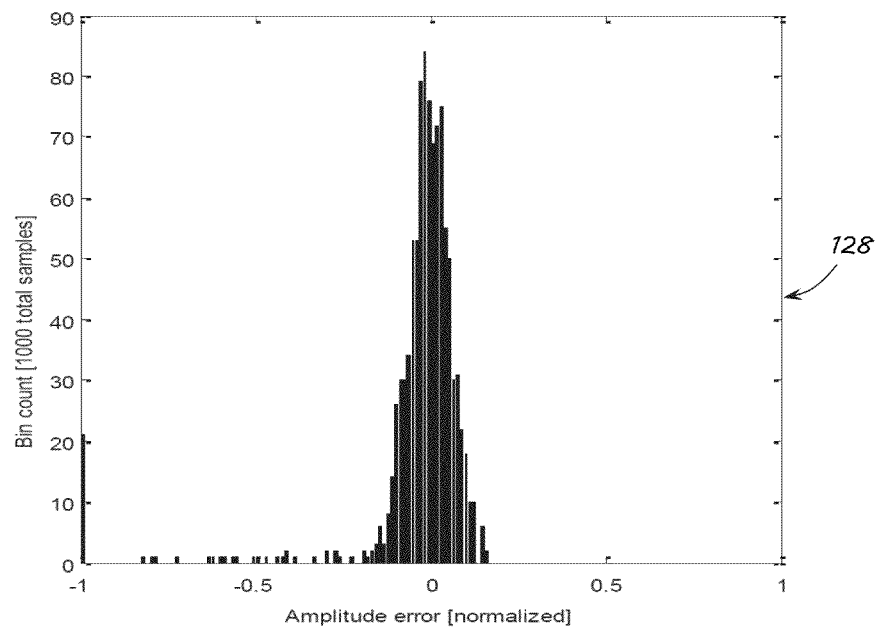
FIG. 10 is a histogram illustrating normalized amplitude estimate error distribution for an exemplary embodiment of the invention.
Figure 11:
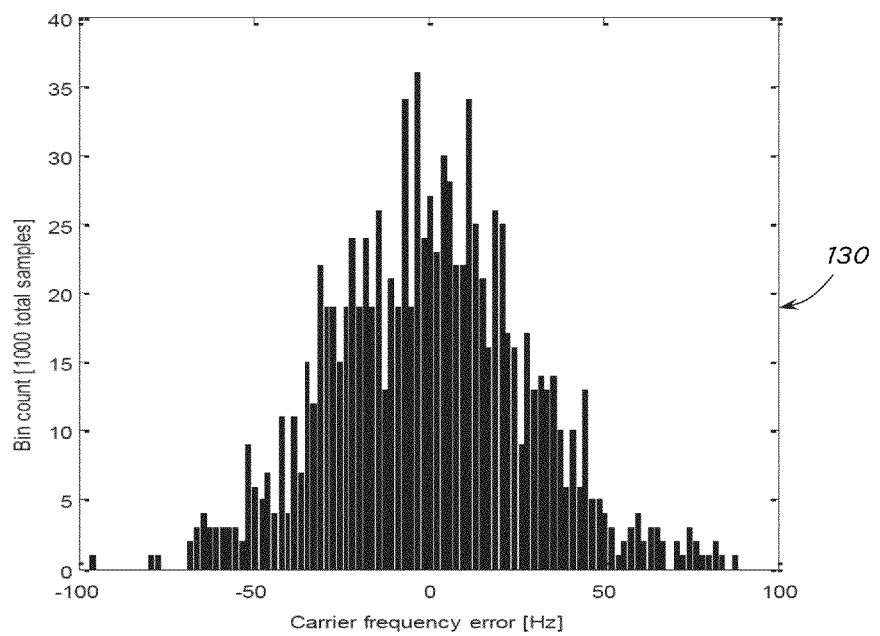
FIG. 11 is a histogram illustrating carrier frequency offset estimate error distribution for the exemplary embodiment of FIG. 10.
Figure 12:
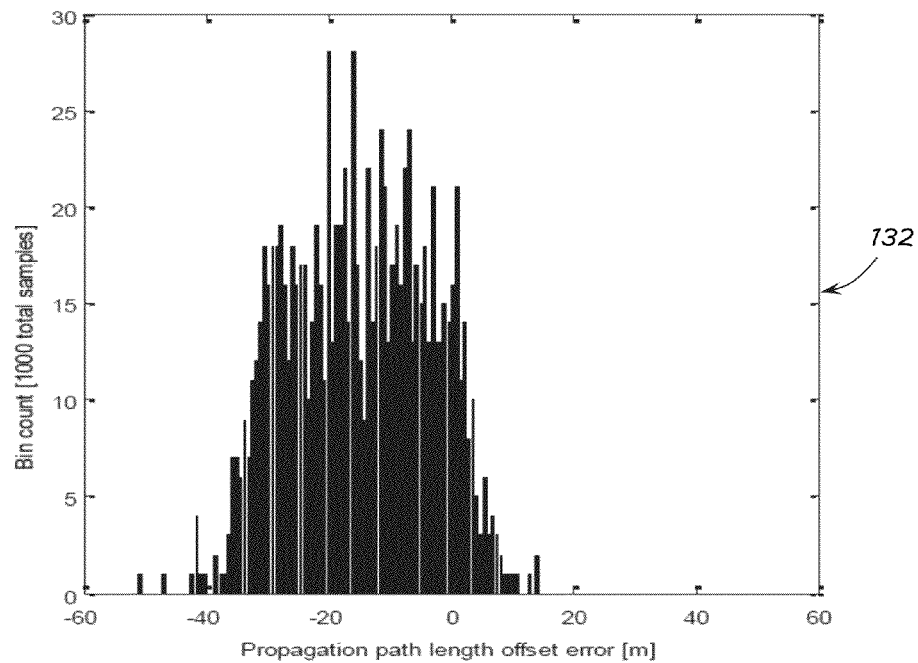
FIG. 12 is a histogram illustrating propagation path length offset error distribution for the exemplary embodiment of FIG. 10.
Figure 13:
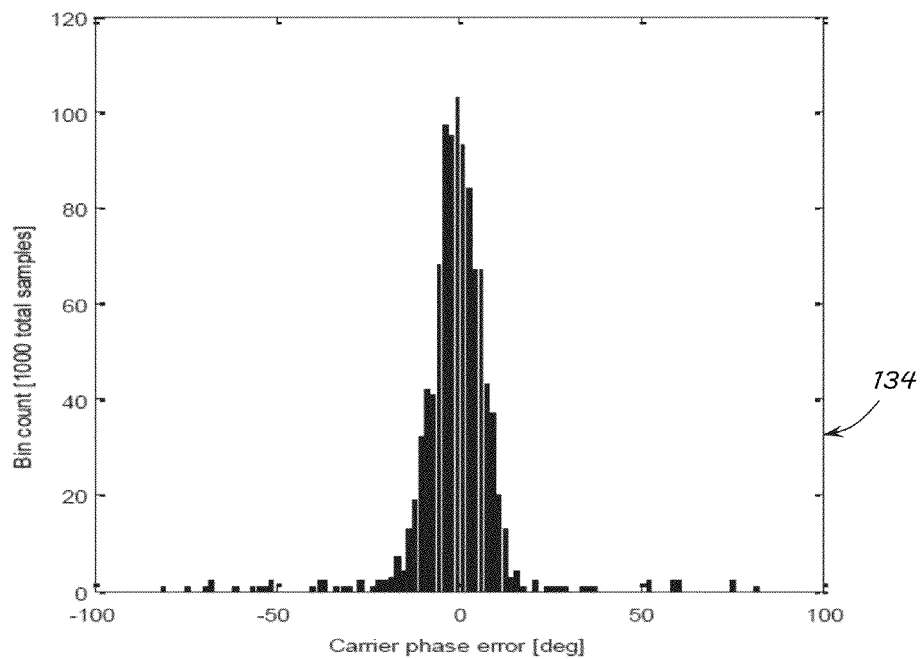
FIG. 13 is a histogram illustrating carrier phase error distribution for the exemplary embodiment of FIG. 10.

The estimate error is then computed in block 104. This process accepts $\chi_{P_m}$ as an input and outputs the estimate error $E_{P_m}$. Graph 106 in FIG. 9 illustrates the error associated with each ray estimate. The true number of multipath rays used in constructing graph 106 is five, though the error reduction between the estimates for the fifth and sixth rays may lead one to believe that there are six multipath rays. This results simply as a function of an erroneous estimate that coincidentally significantly reduces the error.

The error $E_{P_m}$ is computed as follows:

$$E_{P_m} = \frac{1}{N_\tau N_{f_s}} \sum_{y=0}^{N_\tau-1} \sum_{z=0}^{N_{f_s}-1} |\chi_{P_m}(y,z)|^2 \quad (71)$$

The decision point "m=0" in decision block 108 is used to determine whether the first, or LOS, ray is being considered. If so ("Yes" branch of decision block 108), the estimate parameters output from the search space decomposition are taken as is to be the estimate parameters for the LOS ray. If m>0 ("No" branch of decision block 108), advance is made to another decision point, denoted "$E_{P_m} - E_{P_{m-1}} < \epsilon$" in decision block 110. This decision is made to determine if the current ray estimate improves the global estimate that makes use of all ray parameters obtained using the decomposition algorithm. Therefore, if the estimate associated with ray m improves the estimate error over the estimate associated with ray m−1 by at least the amount specified by the acceptance threshold $\epsilon$ ("Yes" branch of decision block 110), then the estimate is declared to be a valid parameterization of the current ray. If the estimate does not improve the error by at least $\epsilon$ ("No" branch of decision block 110), then the estimate parameters are not considered to be valid, the estimate parameters are discarded, and other regional maxima are considered in block 112. The acceptance threshold used in the example illustrated in graph 106 in FIG. 9 is $\epsilon$=0.

If the estimate associated with ray m improves the estimate error over the estimate associated with ray m−1 by at least the amount specified by the acceptance threshold $\epsilon$ ("Yes" branch of decision block 110), the parameters are output to the ray database in block 114. This process accepts $\tilde{A}_{P_m}$, $\tilde{f}_{P_m}$, $\tilde{\tau}_{P_m}$, and $\tilde{\phi}_{P_m}$ as inputs and does not output anything. The ray database may be used to simply store estimate parameters for use in inter-PIT algorithms. The decomposition algorithm is utilized to extract these parameters, eventually yielding this database. Using this database, multipath rays present in more than one PIT may be considered.

After this process is completed, the ray index m is incremented in block 116, and then another iteration of the decomposition algorithm is performed beginning again at block 42.

If the estimate above does not improve the error by at least $\epsilon$ ("No" branch of decision block 110), alternate regional maxima may be determined in block 112. This process accepts $\chi_{P_{m-1}}$ as an input. The absolute values of each of the elements in $\chi_{P_m}$ are evaluated to determine the locations of regional maxima. The MATLAB® "imregionalmax" command may be used to determine these locations in software, and the 8-neighborhood regional maxima are determined. If there is a regional maximum within $\chi_{P_m}$ that has not yet been considered for estimation ("Yes" branch of decision block 118), then an initial estimation of these alternate peak parameters takes place in block 120. Otherwise ("No" branch of decision block 118), the PIT index is incremented in block 122 and the next PIT is decomposed. If p>$p_{max}$ ("Yes" branch of decision block 124), there are no more PIT-sized vectors of received data to consider, and the algorithm is completed at block 126. Otherwise ("No" branch of decision block 124), the process continues with the next PIT-sized vector at block 38.

If there is a regional maximum within $\chi_{P_m}$ that has not yet been considered for estimation ("Yes" branch of decision block 118), then an initial estimation of these alternate peak parameters takes place in block 120. This process accepts $\chi_{P_{m-1}}$ as an input and outputs $\tilde{f}_{P_m}$, $\tilde{\tau}_{P_m}$, and $\tilde{\phi}_{P_m}$. The choices for the parameters $\tilde{f}_{P_m}$, $\tilde{\tau}_{P_m}$, and $\tilde{\phi}_{P_m}$ correspond with the frequency, the propagation delay, and the carrier phase for the element in $\chi_{P_{m-1}}$ with the highest magnitude that is a regional maximum and has not yet been considered. These parameters are then used to estimate the initial amplitude and the process continues at block 44.

Simulations are conducted to determine the accuracy of the above described signal decomposition and parameterization algorithm in embodiments of the invention for obtaining estimates for ray parameters, in an attempt to quantify the performance of the algorithm. In the simulations, parameter estimates are compared with true parameter values. The following metrics are used to quantify performance:

The bias and standard deviation in amplitude estimates relative to the true amplitude values The bias and standard deviation in Doppler frequency offset estimates relative to the true Doppler frequency offset values The bias and standard deviation in propagation path length offset estimates relative to the true propagation path length values The bias and standard deviation in carrier phase estimates relative to the true carrier phase values Simulations are conducted using the GPS waveform model. To determine the effectiveness of the signal decomposition and parameterization algorithm in an environment with a varying $C/N_0$, the simulated GPS signal and the simulated noise must be scaled before summing the signal and the noise together. This scaling is performed in accordance with theory found in literature, for example Misra et al., "*Global Positioning System: Signals, Measurements, and Performance,*" 2d Ed., Lincoln, Mass., Ganga-Jamuna Press, 2006. Only PRN 26 is considered in simulations, omitting signals from other PRNs normally available in received data. The choice of PRN 26 is entirely arbitrary. The presence of an automatic gain controller is simulated in order to consider data that takes advantage of the full dynamic range afforded by the number of bits used in generating a data set without clipping signal peaks.

Simulations are conducted for various values of $C/N_0$: 40, 45, and 50 dB-Hz, as well as simulations where no noise is present. The number of quantization levels is varied in the simulations as well: 1-bit, 4-bit, 8-bit, and 16-bit fixed, as well as double-precision floating point. For each case of a quantization level coupled with a value of $C/N_0$, 1000 integration periods using a PIT of 1 msec are generated where one discrete-time ray vector, presumed in processing to be line-of-sight, from PRN 26 is added to white Gaussian noise. The simulated intermediate frequency is −38.4 kHz and the simulated sampling frequency is 8.1838 MHz, in line with parameters that would be used for a SiGe GPS front end. The path length offset of the ray within each integration period is fixed, varies between integration periods, and is selected arbitrarily using a uniform random distribution ranging from $-cT_c$ to $cT_c$. The Doppler frequency offset of the ray in each integration period is fixed, varies between integration periods, and is selected arbitrarily using a uniform random distribution ranging from −8 kHz to 8 kHz. The initial carrier phase of the ray in each integration period is fixed, varies between integration periods, and is selected arbitrarily using a uniform random distribution ranging from −180° to 180°. For every ray estimate, 1000 simulated annealing iterations are used to obtain the estimate, i.e., $g_{max}=1000$.

FIGS. 10-13 illustrate the normalized amplitude estimate error distribution (graph 128 in FIG. 10), the carrier frequency offset estimate error distribution (graph 130 in FIG. 11), the propagation path length offset error distribution (graph 132 in FIG. 12), and the carrier phase error distribution (graph 134 in FIG. 13), respectively, for the simulation conducted using double precision floating point numbers and $C/N_0=50$ dB-Hz. These figures are provided to serve as examples of typical error distribution shapes found in the histograms resulting from the simulations set out above.

The table in FIG. 14 illustrates a comparison of the mean amplitude error (normalized) of simulated rays for various quantization levels and various values of $C/N_0$. The table in FIG. 15 illustrates a comparison of the standard deviation of the amplitude error (normalized). Normalization in this context is defined by the following formula: (estimated value−true value)/true value. The table in FIG. 16 illustrates a comparison of the mean frequency offset error (Hz) of simulated rays for various quantization levels and various values of $C/N_0$. The table in FIG. 17 illustrates a comparison of the standard deviation of the frequency offset error (Hz). The table in FIG. 18 illustrates a comparison of the mean path length offset error (m) of simulated rays for various quantization levels and various values of $C/N_0$. The table in FIG. 19 illustrates a comparison of the standard deviation of the path length offset error (m). The table in FIG. 20 illustrates a comparison of the mean carrier phase error (deg) of simulated rays for various quantization levels and various values of $C/N_0$. The table in FIG. 21 illustrates a comparison of the standard deviation of the carrier phase error (deg).

The results provided assist in establishing an understanding of the performance of the algorithm set out above. The results indicate that the algorithm is indeed able to obtain accurate estimates for each of the four key parameters used to define a ray in a setting with a higher $C/N_0$. Higher dynamic ranges demonstrate superior potential for estimation accuracy. Both of these results are to be expected, as both of these results favor the scenario where less noise is present.

The amplitude error distribution (Graph 128), the carrier frequency offset error distribution (Graph 130), and the carrier phase error distribution (Graph 134) all appear to share similarly shaped distribution function (with the exception of the outlier cases where the amplitude is improperly, as observed in Graph 128). Neglecting this relatively small percentage of amplitude errors, all three of these distributions appear to be triangular in nature, though a Gaussian distribution may perhaps adequately describe these error distributions. The propagation path length offset error distribution (Graph 132) appears, on the other hand, to have a uniform distribution with a bias of approximately −14 m among simulations yielding reasonable results. Furthermore, the distribution appears in histograms to range from −35 to +5 m. The path length that would be observed between rays that are received exactly one sampling period $T_s$ apart from each other, using the sampling frequency used in these simulations, is 36.63 m. This is relatively close to the approximately 40 m size of the uniform distribution of results. It has been observed that path length offset estimates using the algorithm's simulated annealing function to estimate parameters are very similar to the initial estimates obtained to initialize the simulated annealing function. Therefore, use of the signal decomposition and parameterization algorithm does not appear to provide better path length offset estimates than what would be obtained using the coarse estimates presented by the search grid for initial estimation and obtained using Eq. 51.

Figure 22:
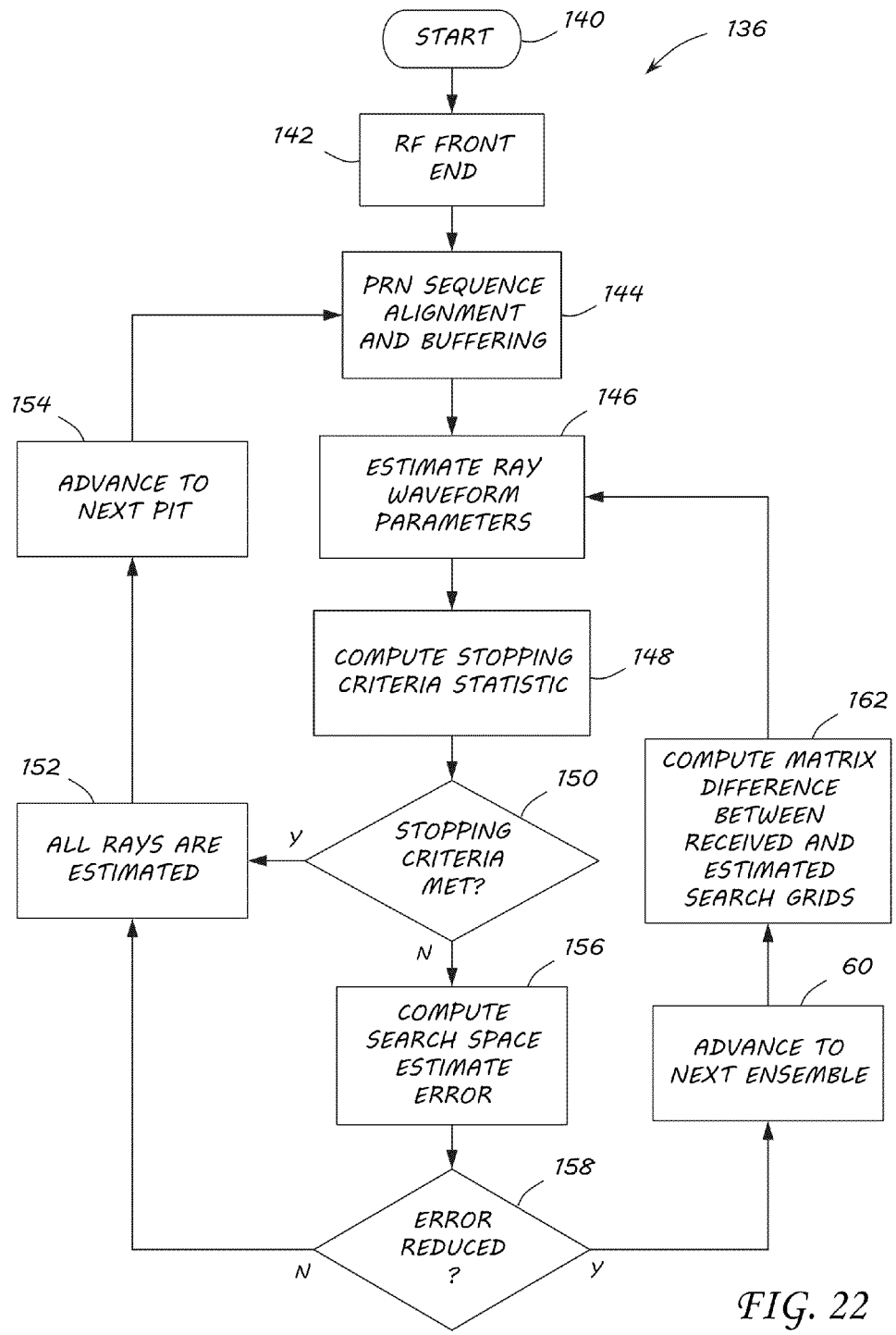
FIG. 22 is a top-level flow chart illustrating an alternate a signal decomposition algorithm consistent with embodiments of the invention.

Flowchart 136 in FIG. 22 illustrates a top-level flow of an alternate embodiment of the intra-PIT signal decomposition algorithm. Flowchart 136 corresponds directly with the process flowchart 138 illustrated in FIGS. 23A and 23B. The process begins at block 140. Similar to the previous illustrated embodiment, RF front end functions (such as frequency downconversion and signal sampling) are performed at block 142. The signal is then aligned such that data is processed by a decomposition algorithm in integer multiples of the duration of the PRN code sequence present in GPS L1 C/A-coded signals, for example, in integer multiples of 1 msec. As with the previous illustrated embodiment, the decomposition algorithm may only to process whole periods of the PRN code sequence. After alignment, received data that is sized to be of PIT-sized duration is input for search grid computation and initially ray parameter estimation in block 146. Amplitude, Doppler frequency, relative propagation delay, and carrier phase are then coarsely estimated. These coarse parameter estimates may then be used to initiate fine estimation of these four parameters for a ray waveform using a stochastic search and optimization technique (simulated annealing) in some embodiments (also in block 146), and a portion of the search grid associated with the estimate parameters may then be removed from the search grid.

The remainder of the search grid may then be evaluated to obtain a stopping criteria statistic in block 148. The stopping criteria statistic may be obtained in some embodiments by comparing a peak power of the search grid with a noise power present in the search grid, though other criteria in other embodiments may also be used. The stopping criteria statistic is then evaluated to determine if the stopping criteria is satisfied in block 150. If the criteria is satisfied ("Yes" branch of decision block 150), then all rays present in the search grid are treated as having been estimated by the algorithm (block 152), and the algorithm advances to the next PIT for decomposition in block 154. If the criteria is not satisfied ("No" branch of decision block 150), then the search grid is evaluated to compute an estimate error in block 156, and the algorithm processor decides if the estimate error can be further reduced in block 158. If so ("Yes" branch of decision block 158), decomposition of the current PIT continues at block 160, and a matrix difference between the received and estimate search grids is computed in block 162 for use in subsequent coarse ray parameter estimation. This process continues until there are no more rays to estimate. If error cannot be reduced ("No" branch of decision block 158), then all rays present in the search grid are treated as having been estimated by the algorithm in block 152, and the algorithm advances to the next PIT for decomposition in block 154. This loop is repeated until all data is processed and parameterized.

The previous illustrated embodiment utilizes hard estimate decisions on ray waveform parameter estimates. The current illustrated embodiment utilizes soft ray waveform parameter estimate decisions that are obtained simultaneously through the parallel estimation of multiple ray waveform parameters, as part of the stochastic search block 146 in FIG. 22. This approach to ray waveform parameter estimation may be referred to as "multiray" estimation.

Figure 23A:
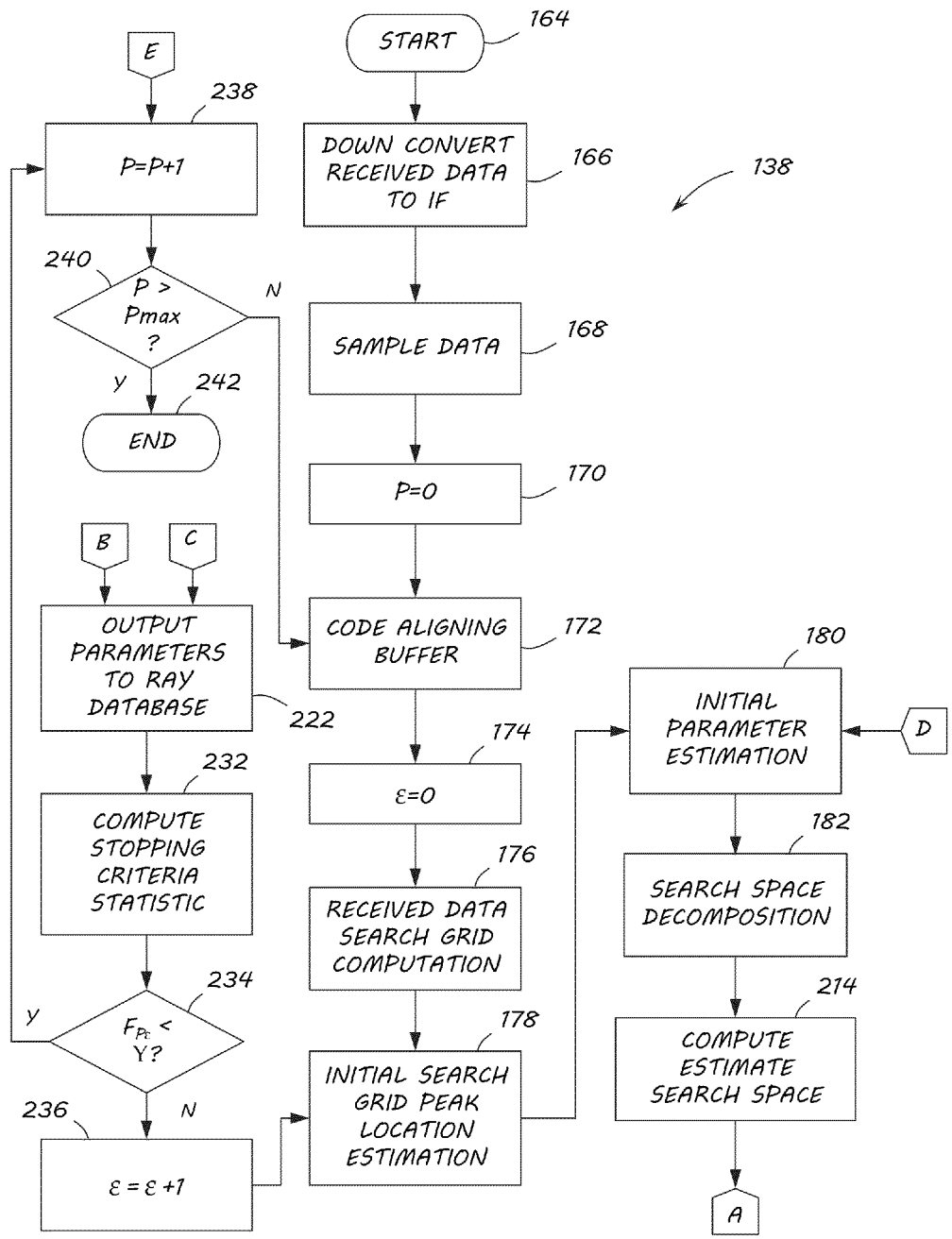
FIGS. 23A and 23B is a flow chart illustrating a signal parameterization algorithm consistent with the embodiment of FIG. 22.
Figure 23B:
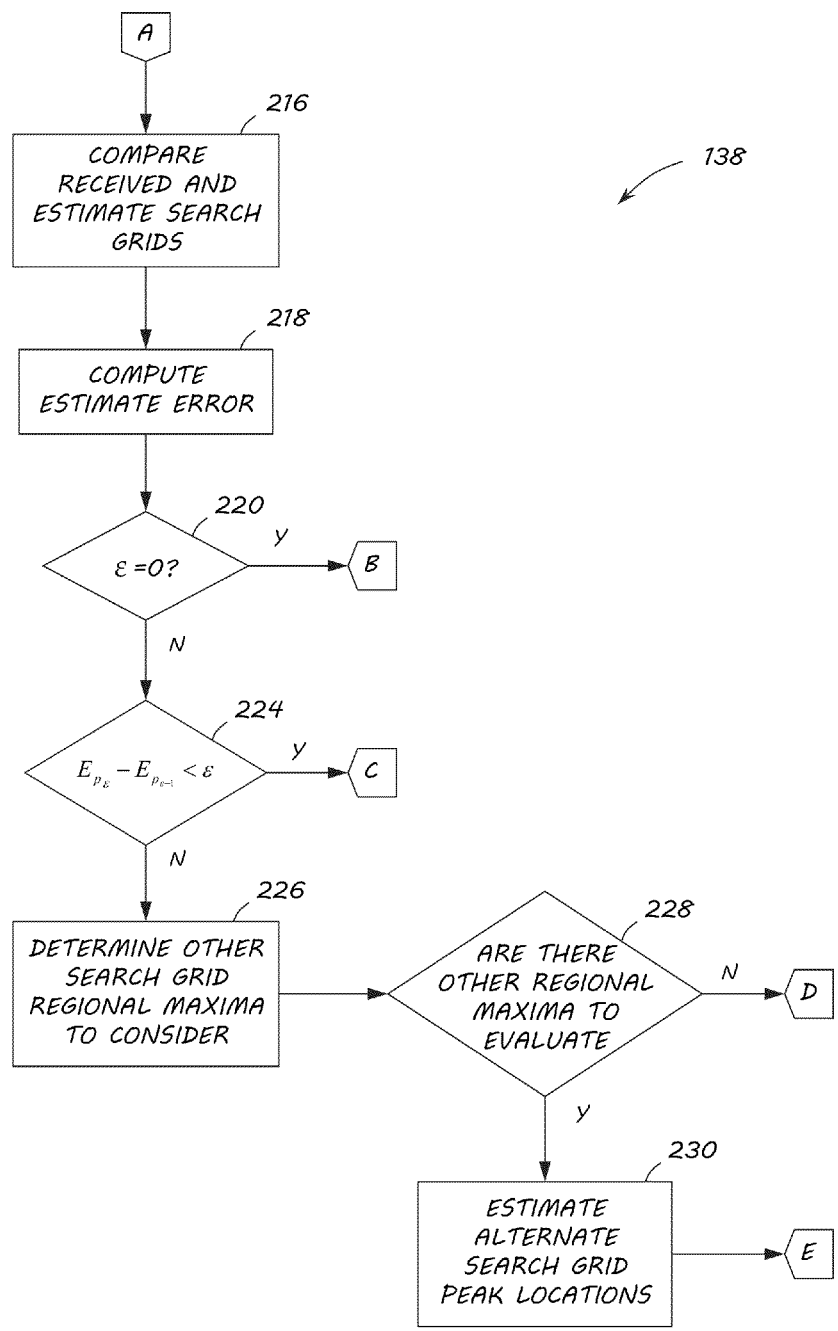

The description of the algorithm illustrated in flowchart 138 in FIGS. 23A and 23B utilizes the continuous time-domain signal model of Eq. 1 set out above. The process begins at block 164. Received data is downconverted at block 166. The downconversion may be executed in RF front end hardware of a software receiver similar to the previous embodiment illustrated above. After the downconversion process, data is sampled at block 168. PIT index value, p, is initialized to zero in block 170. After sampling, the Code-aligned data may be buffered at block 172. ϵ is initialized to zero at block 174. A search grid is computed in block 176. An initial search of estimated grid peak locations is performed in block 178 and initial parameter estimation is performed in block 180. This series of steps utilize the same methodology as set out in the previous illustrated embodiment.

Figure 24:
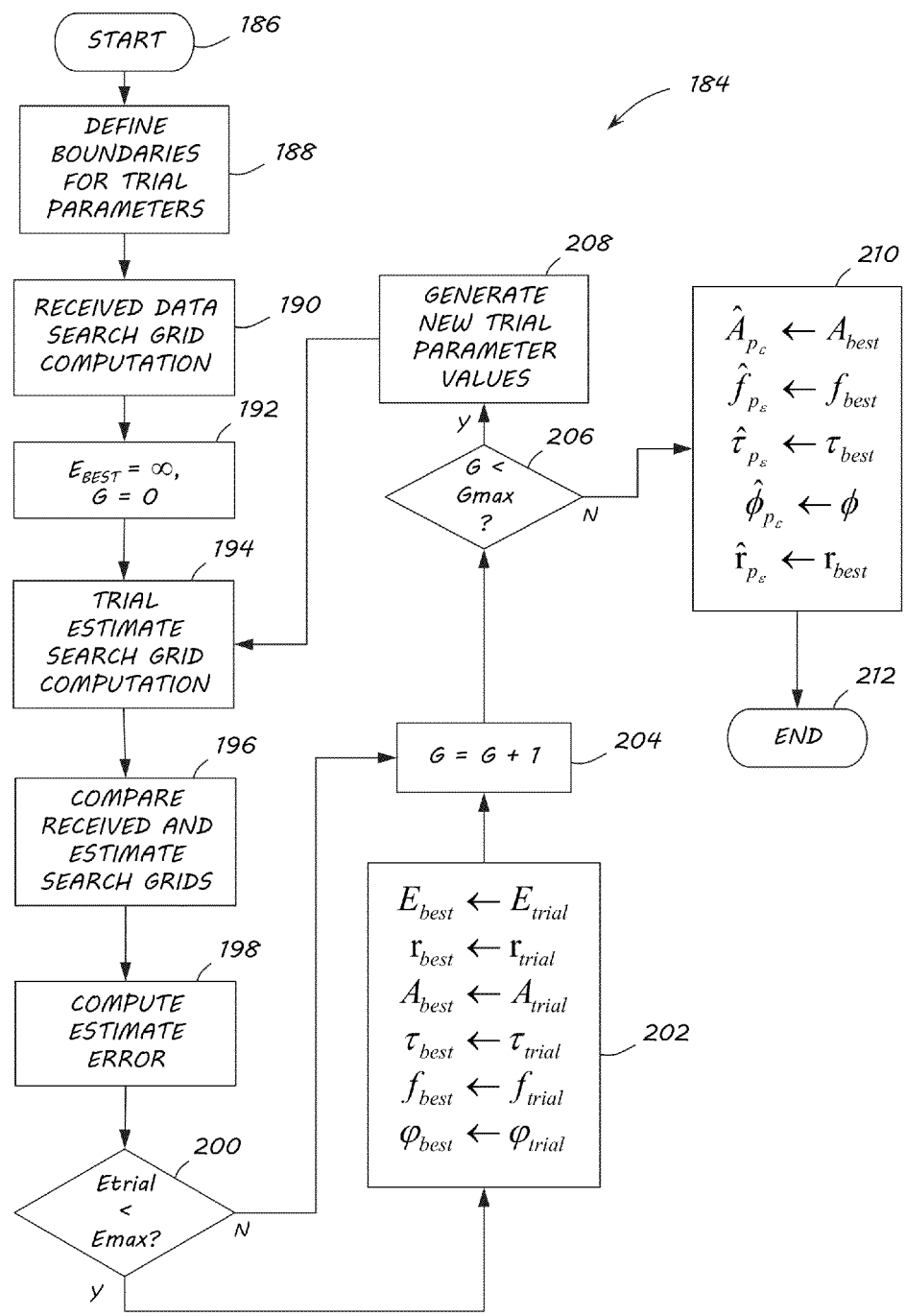
FIG. 24 is a flow chart illustrating a search space decomposition process consistent with embodiment FIG. 22.

FIG. 24 illustrates a flowchart 184 outlining an alternate process used to decompose the search space of block 182 in flowchart 136. This alternate process accepts either $\tilde{A}_{p_\epsilon}$, $\tilde{f}_{p_\epsilon}$, $\tilde{\tau}_{p_\epsilon}$, and $\tilde{\phi}_{p_\epsilon}$ (in cases when ϵ=0) or $\tilde{A}_{p_\epsilon}$, $\tilde{f}_{p_\epsilon}$, $\tilde{\tau}_{p_\epsilon}$, and $\tilde{\phi}_{p_\epsilon}$ (in cases when ϵ>0). Output from this process are the final ray ensemble parameter estimates associated with $\hat{r}_{p_\epsilon}$: the peak amplitude estimates $\hat{A}_{p_\epsilon}$, the frequency estimate $\hat{f}_{p_\epsilon}$, the propagation delay estimates $\hat{\tau}_{p_\epsilon}$, and the carrier phase estimates $\hat{\phi}_{p_\epsilon}$. Estimates are obtained for each of the ϵ+1 rays in ensemble ϵ.

$\tilde{A}_{p_\epsilon}$, $\tilde{f}_{p_\epsilon}$, $\tilde{\tau}_{p_\epsilon}$, $\tilde{\phi}_{p_\epsilon}$, $\hat{A}_{p_\epsilon}$, $\hat{f}_{p_\epsilon}$, $\hat{\tau}_{p_\epsilon}$, and $\hat{\phi}_{p_\epsilon}$ are defined as follows:

$$\tilde{A}_{p_\epsilon} = [\hat{A}_{p_{\epsilon-1}}, \tilde{A}_{p_\epsilon}] \tag{72}$$

$$\tilde{f}_{p_\epsilon} = [\hat{f}_{p_{\epsilon-1}}, \tilde{f}_{p_\epsilon}] \tag{73}$$

$$\tilde{\tau}_{p_\epsilon} = [\hat{\tau}_{p_{\epsilon-1}}, \tilde{\tau}_{p_\epsilon}] \tag{74}$$

$$\tilde{\phi}_{p_\epsilon} = [\hat{\phi}_{p_{\epsilon-1}}, \tilde{\phi}_{p_\epsilon}] \tag{75}$$

where $$\hat{A}_{p_\epsilon} = [\hat{A}_{p_\epsilon}]_{m=0}^{\epsilon} \tag{76}$$

$$\hat{f}_{p_\epsilon} = [\hat{f}_{p_\epsilon}]_{m=0}^{\epsilon} \tag{77}$$

$$\hat{\tau}_{p_\epsilon} = [\hat{\tau}_{p_\epsilon}]_{m=0}^{\epsilon} \tag{78}$$

$$\hat{\phi}_{p_\epsilon} = [\hat{\phi}_{p_\epsilon}]_{m=0}^{\epsilon} \tag{79}$$

The decomposition process begins at block 186. Boundaries are defined for trial parameters in block 188. This subprocess accepts either $\tilde{A}_{p_\epsilon}$, $\tilde{f}_{p_\epsilon}$, $\tilde{\tau}_{p_\epsilon}$, and $\tilde{\phi}_{p_\epsilon}$ (in cases when ϵ=0) or $\tilde{A}_{p_\epsilon}$, $\tilde{f}_{p_\epsilon}$, $\tilde{\tau}_{p_\epsilon}$, and $\tilde{\phi}_{p_\epsilon}$ (in cases when ϵ>0). Output from this subprocess are boundary values (both minimum and maximum) for the trial parameters used to generate trial ray waveforms being considered. Parameter boundaries are output for the peak amplitude ($A_{min}$ and $A_{max}$), carrier frequency ($f_{min}$ and $f_{max}$), propagation delay ($\tau_{min}$ and $\tau_{max}$), and the carrier phase ($\phi_{min}$ and $\phi_{max}$). Also made available is $N_p$. This subprocess is used to simply define the ranges from which trial parameters for the peak amplitude $A_{trial}$, the carrier frequency $f_{trial}$, the propagation delay $\tau_{trial}$, and the carrier phase $\phi_{trial}$ in the decomposition process may be obtained. These ranges are defined as follows:

$$A_{trial} \in [A_{min}, A_{max}] \tag{80}$$

$$f_{trial} \in [f_{min}, f_{max}] \tag{81}$$

$$\tau_{trial} \in [\tau_{min}, \tau_{max}] \tag{82}$$

$$\phi_{trial} \in [\phi_{min}, \phi_{max}] \tag{83}$$

where trial parameter vectors $A_{trial}$, $f_{trial}$, $\tau_{trial}$, and $\phi_{trial}$ generated using simulated annealing are expressed as follows:

$$A_{trial} = [A_{trial_m}]_{m=0}^{\epsilon} \tag{84}$$

$$f_{trial} = [f_{trial_m}]_{m=0}^{\epsilon} \tag{85}$$

$$\tau_{trial} = [\tau_{trial_m}]_{m=0}^{\epsilon} \tag{86}$$

$$\phi_{trial} = [\phi_{trial_m}]_{m=0}^{\epsilon} \tag{87}$$

In this embodiment, boundaries are defined as follows: $A_{min} = 0$ and $A_{max} = \max\{|r_p|\}$. This particular range was selected to dictate in generation of trial parameters that a peak amplitude of a ray waveform may not be outside a range of possible values found in the received data vector. Due to a signal to noise ratio of GPS data recorded using a software receiver, this range is appropriate since peak noise amplitude values will almost certainly exceed the peak amplitude of a GPS waveform. For simulation circumstances in some embodiments, however, $A_{max}$ may need to be modified. Carrier frequency parameter range boundaries and propagation delay parameter range boundaries are defined similar to the previously illustrated embodiment. These boundaries may also be employed for this subprocess. The carrier frequency trail parameter range boundaries are $f_{min} = \hat{f}_{p_0} - 1.1/T_{PIT}$ and $f_{max} = \hat{f}_{p_0} + 1.1/T_{PIT}$ in cases when ϵ=0 or $f_{min} = \hat{f}_{p_0} - 1.1/T_{PIT}$ and $f_{max} = \hat{f}_{p_0} + 1.1/T_{PIT}$ in cases when ϵ>0. In cases when ϵ>0, $f_{min}$ and $f_{max}$ are scalars $$\left(\hat{f}_{p_0} = \hat{f}_{p_{0_0}}\right)$$

since only one ray waveform is parameterized in the estimate waveform generated from the initial ensemble in block 180 of flowchart. Thus, this highest ray index for an ensemble is equal to the ensemble index itself. The propagation delay trial parameter range boundaries are $\tau_{min} = \hat{\tau}_{p_0} - 1.1/T_C$ and $\tau_{max} = \hat{\tau}_{p_0} + 1.1/T_C$ in cases when ϵ=0 or $\tau_{min} = \hat{\tau}_{p_0} - 1.1/T_C$ and $\tau_{max} = \hat{\tau}_{p_0} + 1.1/T_C$ in cases when ϵ>0. In cases when ϵ>0, $\tau_{min}$ and $\tau_{max}$ are scalars since $$\hat{\tau}_{p_0} = \hat{\tau}_{p_{0_0}}.$$

The carrier phase trial parameter range boundaries are $\phi_{min} = -2\pi$ and $\phi_{max} = 2\pi$. This range is chosen to ensure the true value of the carrier phase falls in the range, and to account for the circular, rather than linear, nature of carrier phase values, though other embodiments may use other ranges.

A received data search grid computation is then made in block 190. This subprocess accepts $r_p$ and $N_p$ as inputs and outputs a search grid to be used in the search space decomposition $R_s$. Note that $R_s$ is distinct from $R_p$. This is a design choice that has been made for this embodiment, as an initial estimate used in the search space decomposition process is required to be relatively accurate, thus the use of tight grid spacings, though other choices may be made for other embodiments. The search grid $R_s$ is used to obtain the estimate for the key parameters in an iterative process. The tighter the grid spacing of the search grid, the greater the computational requirement. Therefore, construction of these two search grids is decoupled to ensure the simultaneous accuracy of initial estimates while still retaining the ability to perform the search space decomposition in a reasonable timeframe.

Search grid $R_s$ used in the stochastic search process is computed as follows:

$$R_s = \text{grid}\left(r_p \cdot \tau_{window}, f_{window}, \Delta\tau_{input}, [\Delta f_{input}]_{N_{fft}=N_{finput}}\right) \quad (87)$$

where $\tau_{window}=2T_C$, $f_{window}=10$ kHz, $\Delta\tau_{input}=T_s$, and the frequency grid spacing $\Delta f_s$ is such that the number of points in the FFT used to compute the search grid is equal to $N_{f_{input}}$. The equation for $N_{f_{input}}$ is as follows:

$$N_{f_{input}} = 2^\lambda, \lambda = \left\lceil \log_2\left(\max\left(\frac{f_s}{N_p}, \frac{2}{3N_p T_s}\right)\right)\right\rceil \quad (88)$$

Note that Eq. 36 above is used in the computation of $\Delta f_s$. The number of code delay values, thus the number of rows in the search grid, is denoted $N_{\tau_s}$. The number of frequency values, thus the number of columns in the search grid, is denoted $N_{f_s}$. After the search grid is computed, trial iteration index g is initialized to zero and best error computation $E_{best}$ is initialized to $\infty$ in block 192.

A trial estimate search grid is computed in block 194. This subprocess accepts $A_{trial}$, $f_{trial}$, $\tau_{trial}$, and $\phi_{trial}$ as inputs and outputs a search grid for the trial estimate $R_{trial}$.

In the previously illustrated embodiment, the search grid is generated through the computation of discrete time waveform $r_{trial}$ and the direct transformation of $r_{trial}$ to the search grid $R_{trial}$. This method is more computationally intensive than the present embodiment, which utilizes an approximation to $R_{trial}$ that follows:

$$R_{trial} \approx \text{grid}(r_{trial}, \tau_{window}, f_{window}, \Delta\tau_{input}, \Delta f_{input}) \approx$$

$$\begin{bmatrix} R_{trial}(\beta_0, \gamma_0) & R_{trial}(\beta_0, \gamma_1) & \cdots & R_{trial}(\beta_0, \gamma_{N_f-1}) \\ R_{trial}(\beta_1, \gamma_0) & R_{trial}(\beta_1, \gamma_1) & & R_{trial}(\beta_0, \gamma_{N_f-1}) \\ \vdots & & \ddots & \vdots \\ R_{trial}(\beta_{N_\tau-1}, \gamma_0) & R_{trial}(\beta_{N_\tau-1}, \gamma_1) & \cdots & R_{trial}(\beta_{N_\tau-1}, \gamma_{N_f-1}) \end{bmatrix} \quad (89)$$

where $$R_{trial}(\beta_y, \gamma_z) = \quad (90)$$

$$\sum_{m=0}^{\varepsilon} [A_{trial_m} \text{sinc}(m, z)\varrho(m, y)\exp(j(\pi(f_{trial_m}-\gamma_z)T_{PIT}+\phi_{trial_m}))]$$

$$\text{sinc}(m, z) = \begin{cases} \dfrac{\sin(\pi(f_{trial_m}-\gamma_z)T_{PIT})}{\pi(f_{trial_m}-\gamma_z)T_{PIT}}, & f_{trial_m}-\gamma_z \neq 0 \\ 1, & f_{trial_m}-\gamma_z = 0 \end{cases} \quad (91)$$

$$\varrho(m, y) \approx \begin{cases} 1-\left|\dfrac{\tau_{trial_m}-\beta_y}{T_c}\right|, & |\tau_{trial_m}-\beta_y| \leq T_c \\ 0, & |\tau_{trial_m}-\beta_y| > T_c \end{cases} \quad (92)$$

The same grid parameters used to define the received search grid $R_s$ in Eq. 87 are used to define the trial estimate search grid $R_{trial}$ in Eq. 89.

Received and estimate search grids are compared in block 196. This subprocess accepts $R_s$ and $R_{trial}$ as inputs and outputs a comparison matrix $\chi_{trial}$. $\chi_{trial}$ is computed by subtracting $R_{trial}$ from $R_s$. After the comparison, an error estimate is computed in block 198. This subprocess accepts $\chi_{trial}$ as an input and outputs a trial estimate error $E_{trial}$ associated with the trial parameters. $E_{trial}$ is computed using the following equation:

$$E_{trial} = \sqrt{\frac{1}{N_{\tau_s}N_{f_s}}\sum_{y=0}^{N_{\tau_s}-1}\sum_{z=0}^{N_{f_s}-1}|\chi_{trial}(y, z)|^2} \quad (93)$$

Decision point at block 200 is used to determine whether or not the current error $E_{trial}$ is superior to previous error values. If this is the case ("Yes" branch of decision block 200), the parameters for the best estimate are asserted as the current parameters in the subsequent subprocesses at block 202. Regardless of whether or not $E_{trial} < E_{best}$, the iteration index g is then incremented in block 204. Decision point at block 206 is then used to determine whether further iterations of trial parameter generation and comparison with received data shall take place. If g is less than $g_{max}$ ("Yes" branch of decision block 206), then further iterations occur, starting with the generation of new trial parameter values at block 208. Otherwise ("No" branch of decision block 208), the best estimates are asserted as the final parameters in block 210. In this illustrated embodiment, the number of iterations ($g_{max}$) is set to 1000 when using simulated annealing to generate new trial parameter values, though other numbers for the maximum iterations may also be used. Upon assertion of final parameter values in block 210, the search space decomposition process completes at block 212.

Returning now to flowchart 136 in FIGS. 23A and 23B, the estimate search space is computed in block 214. This subprocess accepts $\hat{A}_{p_\varepsilon}$, $\hat{f}_{p_\varepsilon}$, $\hat{\tau}_{p_\varepsilon}$, and $\hat{\phi}_{p_\varepsilon}$ as inputs and outputs an estimate search grid $\hat{R}_{p_\varepsilon}$. To compute $\hat{R}_{p_\varepsilon}$, an estimate discrete time-domain waveform $\hat{r}_{p_\varepsilon}$ must first be computed using the following equation:

$$\hat{r}_{p_\varepsilon} = \sum_{m=0}^{\varepsilon} \hat{r}_{p_{\varepsilon_m}} \quad (94)$$

where

-continued $$\hat{r}_{p\varepsilon_m} = \qquad (95)$$

$$\begin{cases} \hat{A}_{p\varepsilon_m} \hat{\chi}_{p\varepsilon_m} \cdot \left[\exp\left(j(2\pi(f_{IF} + \hat{f}_{p\varepsilon_m})T_s w + \hat{\phi}_{p\varepsilon_m})\right)\right]_{w=0}^{N_p-1}, & r_p \in \mathbb{C} \\ \text{Re}\left\{\hat{A}_{p\varepsilon_m} \hat{\chi}_{p\varepsilon_m} \cdot \left[\exp\left(j(2\pi(f_{IF} + \hat{f}_{p\varepsilon_m})T_s w + \hat{\phi}_{p\varepsilon_m})\right)\right]_{w=0}^{N_p-1}\right\}, & r_p \in \mathbb{R} \end{cases}$$

and the computation of $$\hat{\chi}_{p\varepsilon_m}$$

makes use of Eq. 40 as follows:

$$\hat{\chi}_{p\varepsilon_m} = \chi_s(\hat{\tau}_{p\varepsilon_m}) \qquad (96)$$

To compute the search grid $\hat{R}_{p_\epsilon}$, the following equation is used:

$$\hat{R}_{p_\epsilon} = \text{grid}(\hat{f}_{p_\epsilon}, \tau_{window}, f_{window}, \Delta\tau_{input}, \Delta f_{input}) \qquad (97)$$

Received and estimated search spaces are then compared in block 216. This subprocess accepts $R_p$ and $\hat{R}_{p_\epsilon}$ as inputs and outputs the comparison matrix $\chi_{p_\epsilon}$ which is calculated by subtracting $\hat{R}_{p_\epsilon}$ from $\hat{R}_{p_\epsilon}$. An error estimate is then computed in block 218. This subprocess accepts $\chi_{p_\epsilon}$ as an input and outputs an estimate error $E_{p_\epsilon}$, which is computed as follows:

$$E_{p_\varepsilon} = \sqrt{\frac{1}{N_\tau N_f} \sum_{y=0}^{N_\tau-1} \sum_{z=0}^{N_f-1} |\chi_{p_\varepsilon}(y,z)|^2} \qquad (98)$$

Decision point in block 220 is used to determine whether the first, or LOS, ray is being considered. If $\epsilon=0$ ("Yes" branch of decision block 220), then the estimate parameters output from the search space decomposition are taken as is to be the estimate parameters for the LOS ray in block 222. If $\epsilon>0$ ("No" branch of decision block 220), then the algorithm advances to another decision point at block 224. This decision is made to determine if the current ensemble of ray parameter estimates improves the global estimate that makes use of all ray parameters within $\epsilon$ obtained using the decomposition algorithm. Therefore, if the parameter estimates associated with $\epsilon$ improve or remain the same in error relative to the estimates associated with ensemble $\epsilon-1$ ("Yes" branch of decision block 224), then the ensemble is declared to be a valid parameterization, and the ray parameters are output to the ray database in block 222. If the ensemble does not reduce or match the error from the previous ensemble ("No" branch of decision block 224), then the ensemble is not considered to be valid, the ensemble is discarded, and other regional maxima are considered in blocks 226, 228, and 230 similar to the previous illustrated embodiment.

After parameters have been output to the ray database in block 222, a stopping criteria statistic is computed in block 232. This subprocess accepts $\chi_{p_\epsilon}$ as an input and outputs stopping criteria statistic $F_{p_\epsilon}$. $F_{p_\epsilon}$ may be described as a peak signal content magnitude to noise power comparison parameter. $F_{p_\epsilon}$ is computed using a cumulative distribution function (cdf) of a Rayleigh distribution as follows:

$$F_{p\varepsilon} = 1 - \exp\left(-\frac{\xi_{p\varepsilon}^2}{2\sigma_x^2}\right), \xi \geq 0 \qquad (99)$$

To obtain $\xi_{p_\epsilon}$, Eq. 49 is used to determine the initial Doppler frequency propagation delay parameters, where $y_{min}$ and $y_{max}$ bind the indices considered in $\chi_{p_\epsilon}$ to those corresponding with the following condition:

$$\beta_{y_{min}} \leq \hat{\tau}_{p_0} \leq \beta_{y_{max}}.$$

$z_{min}$ and $z_{max}$ bind the indices considered in establishing $\xi_{p_\epsilon}$ to those corresponding with the following condition:

$$\gamma_{z_{min}} \leq \hat{f}_{p_0} \leq \gamma_{z_{max}}.$$

$\xi_{p_\epsilon}$ is then obtained using the following equation:

$$\xi_{p_\epsilon} = |\chi_{p_\epsilon}(y_{peak}, z_{peak})| \qquad (100)$$

The carrier frequency trial parameter range boundaries are $f_{min} = \hat{f}_{p_0} - 1.1/T_{PIT}$ and $f_{max} = \hat{f}_{p_0} + 1.1/T_{PIT}$. The propagation delay trial parameter range boundaries are $\tau_{min} = \hat{\tau}_{p_0} - (T_c + 9 \times 10^{-7})$ and $\tau_{max} = \hat{\tau}_{p_0} + (T_c + 9 \times 10^{-7})$. Multipath signal content is expected to be delayed at most by $1.8 \times 10^{-6}$ sec of the LOS ray, thus the use of this value in setting the boundary conditions for the propagation delay.

To obtain $\sigma_x$, it is assumed that there is no signal content present outside the boundary conditions outlined in the previous paragraph. The complex values of all the elements in $\chi_{p_\epsilon}$ from grid points with indices corresponding with Doppler frequency or propagation delay values outside these boundaries are concatenated into a single vector. The standard deviation $\sigma_x$ of either the real or imaginary components is then computed. Given the assumption that this noise content originates from circular complex AWGN, the standard deviation of the real components should be equal to the standard deviation of the imaginary components.

Upon computation of $F_{p_\epsilon}$, a stopping criteria is then applied using the following decision criteria in block 234:

$$F_{p\varepsilon} \underset{\text{Halt}}{\overset{\text{Continue}}{\lessgtr}} \Upsilon \qquad (101)$$

where $\Upsilon$ is the stopping criteria threshold. The stopping criteria threshold $\Upsilon$ may be determined through simulation or other methods in other embodiments. If $F_{p_\epsilon} \geq \Upsilon$ ("No" branch of decision block 234), then the ensemble index $\epsilon$ is incremented in block 236 and the next ensemble for the same PIT is considered for decomposition starting at block 178. If $F_{p_\epsilon} < \Upsilon$ ("Yes" branch of decision block 234), decomposition of the current PIT is halted and the PIT index is incremented in block 238. If there are no more integration periods remaining to be processed ("Yes" branch of decision block 240), then the algorithm concludes at block 242. Otherwise ("No" branch of decision block 240), the next integration period is process starting at block 172.

Figure 25:
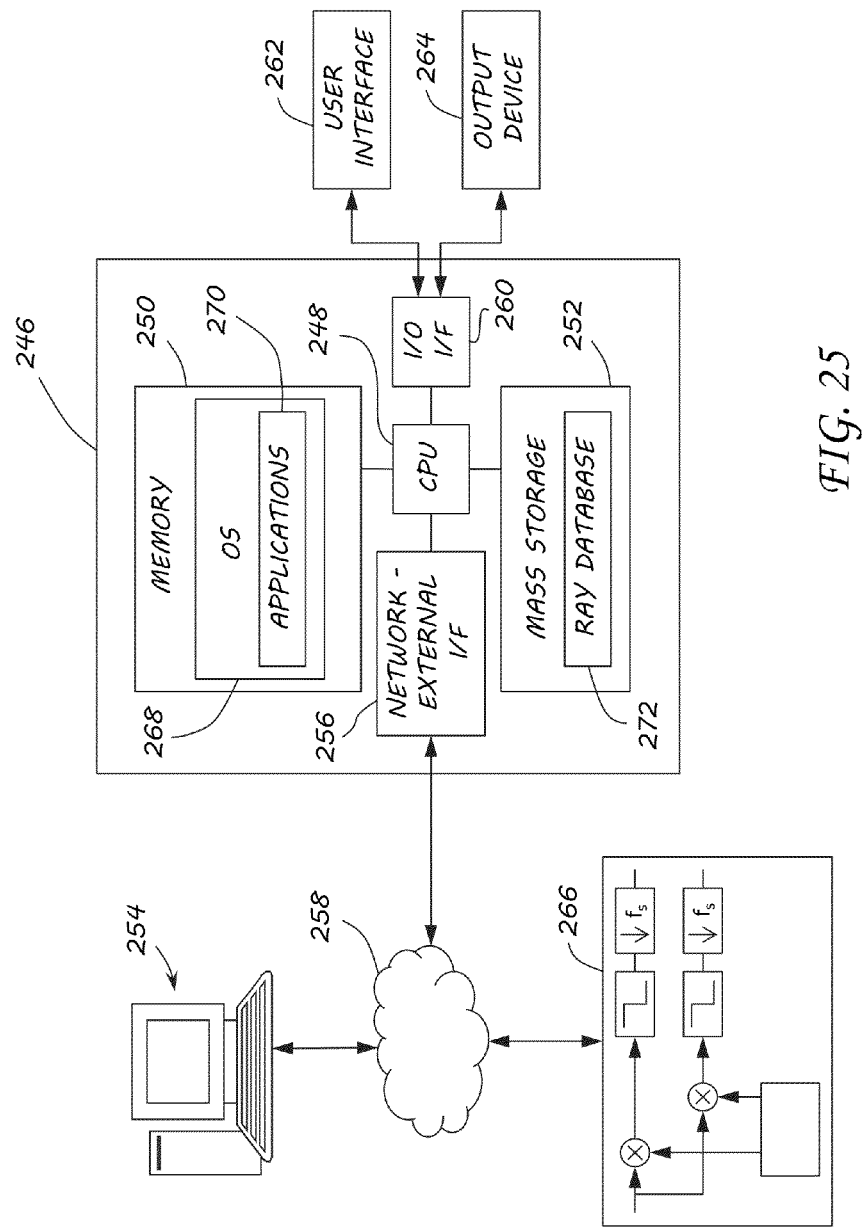
FIG. 25 is an exemplary hardware and software environment consistent with embodiments of the invention.

Embodiments of the signal decomposition and parameterization algorithm may be implemented in any number of hardware/software configurations. FIG. 25 is a diagrammatic illustration of an exemplary hardware and software environment for an apparatus 246 configured to execute the signal decomposition and parameterization algorithm consistent with embodiments of the invention. Apparatus 246, in specific embodiments, may be a general purpose processor, application specific integrated circuit (ASIC), field programmable gate array (FPGA), computer, computer system, computing device, server, disk array, or programmable device such as a multi-user computer, a single-user computer, a handheld computing device, a networked device (including a computer in a cluster configuration), a mobile telecommunications device, a video game console (or other gaming system), etc. Apparatus 246 may be referred to as "computing apparatus," but will be referred to herein as a "general purpose processor."

The general purpose processor 246 includes at least one central processing unit ("CPU") 248 coupled to a memory 250. Each CPU 248 is typically implemented in hardware using circuit logic disposed on one or more physical integrated circuit devices or chips. Each CPU 248 may be one or more microprocessors, micro-controllers, field programmable gate arrays, or ASICs, while memory 250 may include random access memory (RAM), dynamic random access memory (DRAM), static random access memory (SRAM), flash memory, and/or another digital storage medium, and also typically implemented using circuit logic disposed on one or more physical integrated circuit devices, or chips. As such, memory 250 may be considered to include memory storage physically located elsewhere in the general purpose processor 246, e.g., any cache memory in the at least one CPU 248, as well as any storage capacity used as a virtual memory, e.g., as stored on a mass storage device 252, or another computing system through at least one network interface 256 (illustrated as, and hereinafter, "network I/F" 256) by way of at least one network 258. It will be appreciated that the at least one network 258 may include at least one private communications network (e.g., such as an intranet) and/or at least one public communications network (e.g., such as the Internet). Similarly to the general purpose processor 246, computing system 254, in specific embodiments, is a computer, computer system, computing device, server, disk array, or programmable device such as a multi-user computer, a single-user computer, a handheld computing device, a networked device (including a computer in a cluster configuration), a mobile telecommunications device, a video game console (or other gaming system), etc.

The general purpose processor 246 is coupled to at least one peripheral device through an input/output device interface 260 (illustrated as, and hereinafter, "I/O I/F" 260). In particular, the general purpose processor 246 receives data from a user through at least one user interface 262 (including, for example, a keyboard, mouse, a microphone, and/or other user interface) and/or outputs data to the user through at least one output device 264 (including, for example, a display, speakers, a printer, and/or another output device). Moreover, in some embodiments, the I/O I/F 260 communicates with a device that is operative as a user interface 262 and output device 264 in combination, such as a touch screen display (not shown). Furthermore, general purpose processor 246 may communicate through the Network IF 256 with RF front end hardware 266, such as a downconverter and sampler, as illustrated. Alternately, the RF front end hardware 266 may communicate via the I/O I/F 260.

The general purpose processor 246 is typically under the control of an operating system 268 and executes or otherwise relies upon various computer software applications, sequences of operations, components, programs, files, objects, modules, etc., consistent with embodiments of the invention. In specific embodiments, the general purpose processor 246 executes or otherwise relies on an application 270 to implement at least a portion of the signal decomposition and parameterization algorithm to obtain estimates for direct and indirect rays present in receive GNSS data consistent with embodiments of the invention. Moreover, and in specific embodiments, the general purpose processor 246 may be configured with a ray database 272 to store estimate parameters for use in inter-PIT algorithms consistent with embodiments of the invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for intra-Pre-detection Integration Time (PIT) signal decomposition of a signal received with RF front end hardware, the method comprising:

sampling the received signal;

aligning the sampled signal into integer multiples of a duration of a pseudorandom noise code sequence by dividing the sampled signal into vectors;

computing a first search grid based on the aligned signal, including:

estimating Doppler frequency offset, propagation delay, and carrier phase values, and calculating an initial amplitude estimate using the estimated Doppler frequency offset, propagation delay, and carrier phase values;

coarsely estimating a plurality of initial ray parameters associated with the first computed search grid;

using the coarsely estimated plurality of initial ray parameters to initiate fine estimation of the plurality of initial ray parameters utilizing stochastic search and optimization techniques;

computing an estimate error for the fine estimation of the plurality of initial ray parameters; and in response to determining a reduction in the computed estimate error, removing the fine estimation of the plurality of initial ray parameters from the first computed search grid.

2. The method of claim 1, wherein the plurality of initial ray parameters is selected from a group consisting of: amplitude, carrier frequency, Doppler offset, propagation delay, carrier phase, and combinations thereof.

3. The method of claim 1, wherein the sampled signal is divided into PIT-sized vectors.

4. The method of claim 1, wherein initiating the fine estimation of the plurality of initial ray parameters comprises:

decomposing a calculated search space; and computing an estimate search space.

5. The method of claim 4, wherein decomposing the calculated search space comprises:

computing a second search grid;

constructing a trial code delay vector;

constructing a trial ray waveform vector;

computing a trial estimate second search grid using the trial code delay vector and the trial ray waveform vector; and comparing a received data search grid and the computed trial estimate second search grid.

6. The method of claim 1, wherein the received signal is a GPS L1 C/A-coded signal.

7. An apparatus, comprising:
RF front end hardware configured to receive, downconvert, and sample a signal;
a memory;
a processor; and
a program code resident in the memory and configured to be executed by the processor for intra-Pre-detection Integration Time (PIT) signal decomposition of the signal received by the RF front end hardware, the program code further configured to align the sampled signal by the RF front end hardware into integer multiples of a duration of a pseudorandom noise code sequence by dividing the sampled signal into vectors, compute a first search grid based on an integer multiple of the aligned signal, including estimating Doppler frequency offset, propagation delay, and carrier phase values, and calculating an initial amplitude estimate using the estimated Doppler frequency offset, propagation delay, and carrier phase values, coarsely estimate a plurality of initial ray parameters associated with the first computed search grid, use the coarsely estimated plurality of initial ray parameters to initiate fine estimation of the plurality of initial ray parameters utilizing stochastic search and optimization techniques, compute an estimate error for the fine estimation of the plurality of initial ray parameters, compute a stopping criteria statistic by comparing a peak power of the first search grid with a noise power present in the first search grid, and in response to determining the stopping criteria statistic is less than a stopping criteria threshold, processing a next integer multiple of the aligned signal.

8. The apparatus of claim 7, wherein the plurality of initial ray parameters is selected from a group consisting of: amplitude, carrier frequency, Doppler offset, propagation delay, carrier phase, and combinations thereof.

9. The apparatus of claim 7, wherein the program code is further configured to divide the sampled signal into PIT-sized vectors.

10. The apparatus of claim 7, wherein the program code is further configured to initiate the fine estimation of the plurality of initial ray parameters by:
decomposing a calculated search space; and
computing an estimate search space.

11. The apparatus of claim 10, wherein the program code is further configured to decompose the calculated search space by:
computing second search grid;
constructing trial code delay vector;
constructing trial ray waveform vector;
computing trial estimate second search grid using the trial code delay vector and trial ray waveform vector; and
comparing received data search grid and the computed trial estimate second search grid.

12. The apparatus of claim 7, wherein the signal received by the RF front end hardware is a GPS L1 C/A-coded signal.

13. The apparatus of claim 7, wherein the stopping criteria statistic is computed using a cumulative distribution function of a Rayleigh distribution.

14. The apparatus of claim 13, wherein the cumulative distribution function is expressed as $$F_{p_\varepsilon} = 1 - \exp\left(-\frac{\xi_{p_\varepsilon}^2}{2\sigma_x^2}\right), \xi \geq 0,$$

wherein $F_{p_\varepsilon}$ is a peak signal content magnitude to noise power comparison parameter, $\xi_{p_\varepsilon}$ is an independent input variable, and $\sigma_x$ is a standard deviation.

15. A method for intra-Pre-detection Integration Time (PIT) signal decomposition of a signal received with RF front end hardware, the method comprising:
sampling the signal received with the RF front end hardware;
aligning the sampled signal into integer multiples of a duration of a pseudorandom noise code sequence by dividing the sampled signal into vectors;
computing a first search grid based on an integer multiple of the aligned signal, including:
estimating Doppler frequency offset, propagation delay, and carrier phase values, and
calculating an initial amplitude estimate using the estimated Doppler frequency offset, propagation delay, and carrier phase values;
coarsely estimating a plurality of initial ray parameters associated with the computed first search grid;
using the coarsely estimated plurality of initial ray parameters to initiate fine estimation of the plurality of initial ray parameters utilizing stochastic search and simulated annealing;
computing a stopping criteria statistic by comparing a peak power of the first search grid with a noise power present in the first search grid; and
in response to determining the stopping criteria statistic is less than a stopping criteria threshold, processing a next integer multiple of the aligned signal.

16. The method of claim 15, wherein the plurality of initial ray parameters is selected from a group consisting of: amplitude, carrier frequency, Doppler offset, propagation delay, carrier phase, and combinations thereof.

17. The method of claim 15, wherein the sampled signal is divided into PIT-sized vectors.

18. The method of claim 15, wherein initiating the fine estimation of the plurality of initial ray parameters comprises:
decomposing a calculated search space; and
computing an estimate search space.

19. The method of claim 18, wherein decomposing the calculated search space comprises:
computing a second search grid;
constructing a trial code delay vector;
constructing a trial ray waveform vector;
computing a trial estimate second search grid using the trial code delay vector and the trial ray waveform vector; and
comparing a received data search grid and the computed trial estimate second search grid.

20. The method of claim 15, wherein the stopping criteria statistic is computed using a cumulative distribution function of a Rayleigh distribution.

21. The method of claim 20, wherein the cumulative distribution function is expressed as $$F_{p_\varepsilon} = 1 - \exp\left(-\frac{\xi_{p_\varepsilon}^2}{2\sigma_x^2}\right), \xi \geq 0,$$

wherein $F_{p_\epsilon}$ is a peak signal content magnitude to noise power comparison parameter, $\xi_{p_\epsilon}$ is an independent input variable, and $\sigma_x$ is a standard deviation.

* * * * *